(12) United States Patent
Wu et al.

(10) Patent No.: US 11,070,879 B2
(45) Date of Patent: Jul. 20, 2021

(54) MEDIA CONTENT RECOMMENDATION THROUGH CHATBOTS

(71) Applicant: Microsoft Technology Licensing, LLC, Redmond, WA (US)

(72) Inventors: Xianchao Wu, Tokyo (JP); Keizo Fujiwara, Kawasaki (JP); Sayuri Miyakawa, Tokyo (JP)

(*) Notice: Subject to any disclaimer, the term of this patent is extended or adjusted under 35 U.S.C. 154(b) by 0 days.

(21) Appl. No.: 16/617,165

(22) PCT Filed: Jun. 21, 2017

(86) PCT No.: PCT/CN2017/089343
§ 371 (c)(1),
(2) Date: Nov. 26, 2019

(87) PCT Pub. No.: WO2018/232622
PCT Pub. Date: Dec. 27, 2018

(65) Prior Publication Data
US 2020/0154170 A1    May 14, 2020

(51) Int. Cl.
| | |
|---|---|
| *H04N 21/466* | (2011.01) |
| *H04L 12/58* | (2006.01) |
| *H04N 21/45* | (2011.01) |
| *H04N 21/4788* | (2011.01) |
| *H04N 21/81* | (2011.01) |
| *H04N 21/8549* | (2011.01) |

(52) U.S. Cl.
CPC ......... *H04N 21/4668* (2013.01); *H04L 51/02* (2013.01); *H04N 21/4532* (2013.01); *H04N 21/4666* (2013.01); *H04N 21/4788* (2013.01); *H04N 21/812* (2013.01); *H04N 21/8549* (2013.01)

(58) Field of Classification Search
CPC ........... H04N 21/4668; H04N 21/4532; H04N 21/4666; H04N 21/4788; H04N 21/812; H04N 21/8549; H04L 51/02
See application file for complete search history.

(56) References Cited

U.S. PATENT DOCUMENTS

| | | | |
|---|---|---|---|
| 7,895,625 B1 | 2/2011 | Bryan et al. | |
| 9,092,415 B2 | 7/2015 | Fife et al. | |
| (Continued) | | | |

FOREIGN PATENT DOCUMENTS

| | | |
|---|---|---|
| CN | 105094641 A | 11/2015 |
| WO | 2008032329 A2 | 3/2008 |
| WO | 2014036192 A1 | 3/2014 |

OTHER PUBLICATIONS

"First Office Action and Search Report Issued in Chinese Patent Application No. 201780063786.3", dated Sep. 16, 2020, 16 Pages.
"International Search Report and Written Opinion Issued in PCT Application No. PCT/CN2017/089343", dated Mar. 6, 2018, 9 Pages.

(Continued)

*Primary Examiner* — John R Schnurr
(74) *Attorney, Agent, or Firm* — Schwegman Lundberg & Woessner, P.A.

(57) ABSTRACT

The present disclosure provides a method for recommending media content through intelligent automated chatting. A message is received from a user in a conversation with the user. A new topic is identified based on the message and context of the conversation. A media content is identified from a set of media contents based on the new topic. A recommendation of the media content is provided in the conversation.

19 Claims, 15 Drawing Sheets

(56) References Cited

U.S. PATENT DOCUMENTS

| | | | |
|---|---|---|---|
| 9,301,015 B2 | 3/2016 | Lenahan et al. | |
| 9,338,493 B2 | 5/2016 | Van Os et al. | |
| 9,374,411 B1 | 6/2016 | Goetz | |
| 9,443,199 B2 | 9/2016 | Pinckney et al. | |
| 9,584,864 B2 | 2/2017 | Roberts et al. | |
| 9,865,260 B1* | 1/2018 | Vuskovic | G06F 40/56 |
| 2006/0156252 A1 | 7/2006 | Sheshagiri et al. | |
| 2009/0019488 A1 | 1/2009 | Ruiz-velasco et al. | |
| 2010/0228777 A1 | 9/2010 | Imig et al. | |
| 2011/0078105 A1 | 3/2011 | Wallace | |
| 2014/0088952 A1 | 3/2014 | Fife et al. | |
| 2014/0351858 A1 | 11/2014 | Chane et al. | |
| 2015/0382047 A1* | 12/2015 | Van Os | G09C 1/00 725/38 |
| 2017/0068423 A1 | 3/2017 | Napolitano et al. | |
| 2017/0169853 A1* | 6/2017 | Hu | H04N 21/235 |
| 2017/0178346 A1* | 6/2017 | Ferro | G06K 9/6274 |
| 2017/0353405 A1* | 12/2017 | O'Driscoll | H04L 51/02 |
| 2020/0021873 A1* | 1/2020 | Swaminathan | G06Q 30/0276 |
| 2020/0221191 A1* | 7/2020 | Baughman | H04N 21/8549 |

OTHER PUBLICATIONS

"Extended European Search Report Issued in European Application No. 17914649.3", dated Oct. 26, 2020, 10 Pages.

Costa, et al., "Emotion-Based Recommender System for Overcoming the Problem of Information Overload", In Proceedings of International Conference on Practical Applications of Agents and Multi-Agent Systems, Jan. 1, 2013, 12 Pages.

Liu, et al., "Social Robot: A Big Data-Driven Humanoid Intelligent System in Social Media Services", In Journal of Multimedia Systems, vol. 22, Issue 1, Apr. 4, 2014, pp. 17-27.

"Second Office Action and Search Report Issued in Chinese Patent Application No. 201780063786.3", dated May 20, 2021, 14 Pages.

* cited by examiner

Prison break's new season will be restarted by Fox.
(Object, Subject)

Compared with "prison break", "breaking bad" has relatively higher scored comments.
(Dependency)

MEDIA CONTENT RECOMMENDATION THROUGH CHATBOTS

CROSS-REFERENCE TO RELATED APPLICATION

This application is a U.S. National Stage Filing under 35 U.S.C. 371 of International Patent Application Serial No. PCT/CN2017/089343, filed Jun. 21, 2017, and published as WO 2018/232622 A1 on Dec. 27, 2018, which application and publication are incorporated herein by reference in their entirety.

BACKGROUND

Artificial intelligence (AI) conversational chat programs are becoming more and more popular. These conversational chat programs, also referred to as chatbots, allow users to carry on conversations with a virtual entity. The chatbot is designed to simulate people's conversation, and may chat with users by text, speech, image, etc.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure provide a method for recommending media content through intelligent automated chatting. A message is received in a conversation. A new topic is identified based on the message and context of the conversation. A media content is identified from a set of media contents based on the new topic. A recommendation of the media content is provided in the conversation It should be appreciated that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several exemplary implementations. It is to be understood that these implementations are discussed only for enabling those skilled in the art to better understand and thus implement the embodiments of the present disclosure, rather than suggesting any limitations on the scope of the present disclosure.

Figure 1:
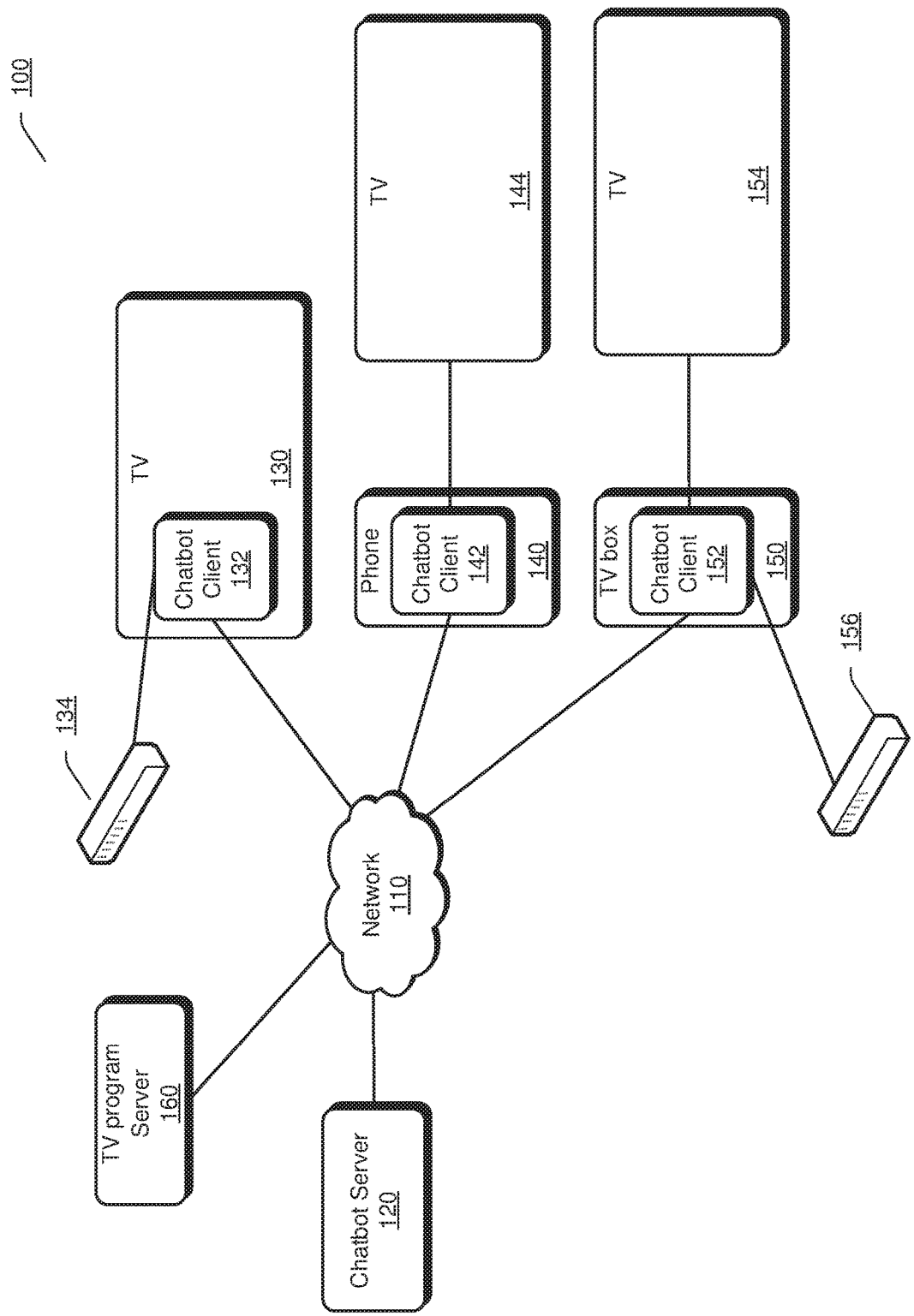
FIG. 1 illustrates an exemplary environment where the described techniques can be implemented according to an embodiment.

FIG. 1 illustrates an exemplary environment where the described techniques can be implemented according to an embodiment.

In the exemplary environment 100, a network 110 is applied for interconnecting among a chatbot server 120, a terminal device 130, 140 or 150 and a TV program server.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device may be any type of computing device capable of connecting to the network 110, accessing servers or websites over the network 110, processing data or signals, etc. The illustrated examples of the terminal device 130 include a television (TV) 130, a phone 140 and a TV box 150. Other examples of the terminal device may be a desktop computer, a laptop, a tablet, a sound box, etc. Although three terminal devices are shown in FIG. 1, it should be appreciated that a different number of terminal devices may connect to the network 110.

The TV 130 may be a smart TV, in which a chatbot client 132 is installed. A remote controller 134 may be used for a user to interact with the TV 130. For example, the remote controller 134 may be used to input information to control the operation of the TV, and may be used to input information to interact with the chatbot client 132. The remote controller 134 may be used to input text information through a text input unit such as a keypad or a touch pad in an implementation, and may be used to input speech information through a speech input unit such as microphone in another implementation.

The phone 140 may be a smart phone which includes a chatbot client 142. In an implementation, the phone 140 is used as a remote controller to control the operation of the TV 144, such as turning on/off the TV, selecting a program channel, booking a program, recording a program, and so on.

The TV box 150 may obtain TV programs from a TV program server 160 and provides the programs to the TV 154 to display. The TV box 150 may typically provide two kinds of TV programs, one is broadcasted programs, and the other is video-on-demand (VOD) programs. A remote controller 156 may be used for a user to interact with the TV box 150 and the chatbot client 152, in a similar way as the remote controller 134. Although the TV box 150 is illustrated as separate from the TV 154, it is possible that the TV box is integrated in a TV such as the TV 154.

The chatbot client 132, 142 or 152 provides a chat service for a user. In some implementations, the chatbot client is an independent client application corresponding to the chatbot service provided by the chatbot server 120. In some other implementations, especially when the chatbot client is implemented in the phone 140, the chatbot client may be implemented in a third party application such as a third party instant messaging (IM) application.

The chatbot client 132, 142 or 152 communicates with the chatbot server 120. For example, the chatbot client 132, 142 or 152 transmits messages inputted by a user to the chatbot server 120, and receives responses associated with the messages from the chatbot server 120. The chatbot client 132, 142 or 152 and the chatbot server 120 may be collectively referred to as a chatbot. As the conversation between the user and the chatbot is performed typically in a query-response manner, the messages inputted by the user are commonly referred to as queries, and the answers outputted by the chatbot are commonly referred to as responses. The query-response pairs may be recorded as user log data. It should be appreciated that, in some implementations, instead of interacting with the chatbot server 120, the chatbot client 132, 142 or 152 may also locally generate responses to queries inputted by the player.

It should be appreciated that all the network entities shown in FIG. 1 are exemplary, and depending on specific application requirements, any other network entities may be involved in the environment 100.

Figure 2:
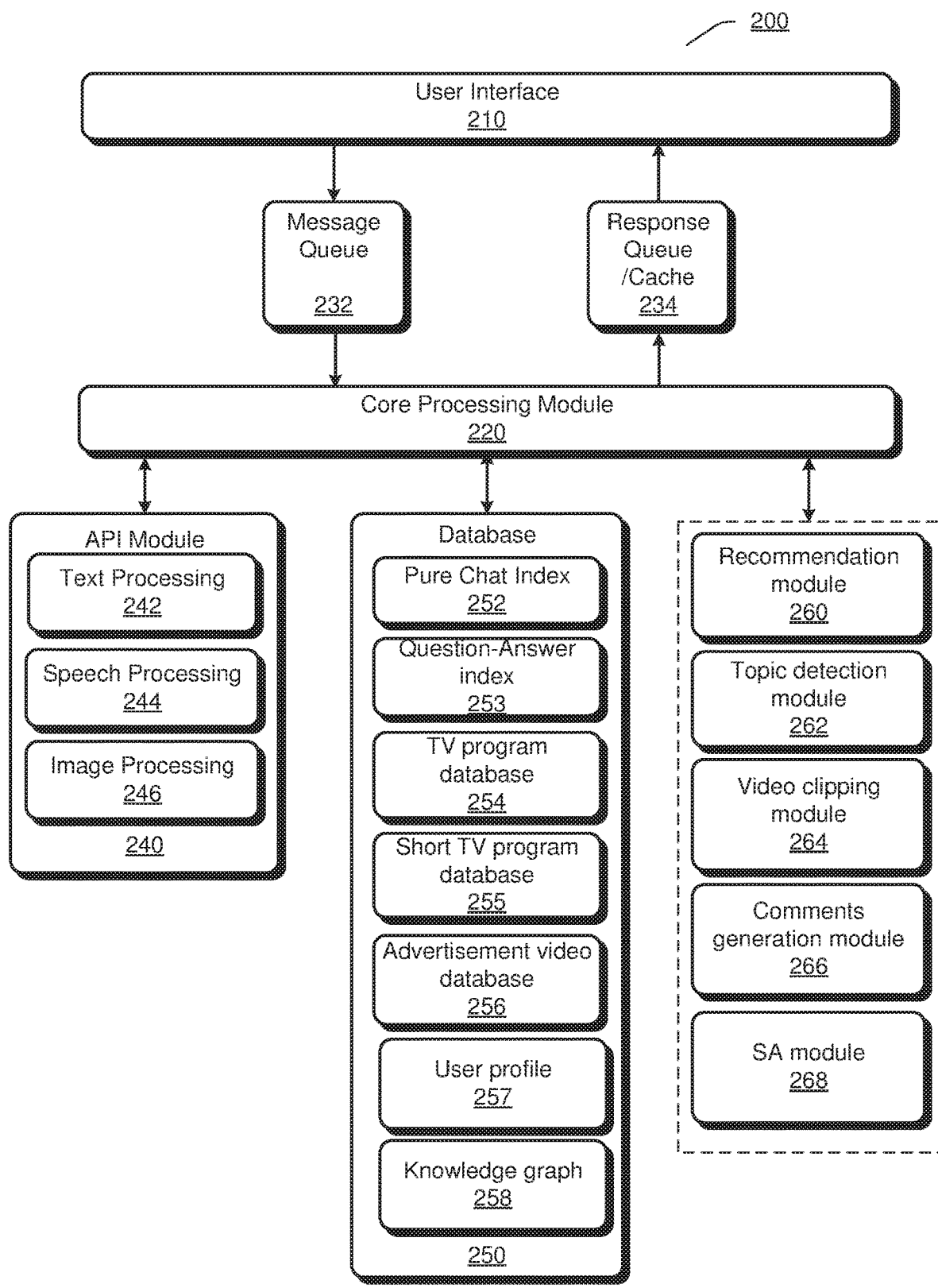
FIG. 2 illustrates an exemplary system applying a chatbot according to an embodiment.

FIG. 2 illustrates an exemplary chatbot system according to an embodiment.

The system 200 may comprise a user interface (UI) 210. The UI 210 may be implemented at the chatbot client 132, 142 or 152, and provide a chat window for interacting between a user and the chatbot.

The queries input by the user via the user interface 210 are transferred to the query queue 232, which temporarily stores users' queries. The users' queries may be in various forms including text, sound, image, video, and so on.

The core processing module 220 may take the messages or queries in the query queue 232 as its input. In some implements, queries in the queue 232 may be served or responded in first-in-first-out manner.

The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text, the text processing unit 242 may perform text understanding on the obtained text, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding text, and the core processing module 220 may further determine a text response. For example, when receiving a dog image from the user, the AI chat system may determine the type and color of the dog and further gives a number of comments, such as "So cute German shepherd! You must love it very much". In some cases, the image processing unit 246 may also be used for obtaining an image response based on the text response.

Moreover, although not shown in FIG. 2, the API module 240 may comprise any other processing units. For example, the API module 240 may comprise a video processing unit for cooperating with the core processing module 220 to process a video message and determine a response. For another example, the API module 240 may comprise a location-based processing unit for supporting location-based services.

Database 250 may comprise a plurality of index items. The index items in the index database 250 may include a pure chat index set 252 and a question-answer pair index set 253, which can be retrieved by the core processing module 220 as responses. Index items in the question-answer pair index set 253 are in a form of question-answer pairs, and the question-answer pair index set 253 may comprise question-answer pairs associated with an application implemented in the chatbot. Index items in the pure chat index set 252 are prepared for free chatting between the user and the chatbot, and may or may not be in a form of question-answer pairs. It should be appreciated that the term question-answer pair may also be referred to as query-response pair or any other suitable terms. Taking the query "Rinna, how old are you" as an example, the core processing module 220 may determine a response "second year of primary high school" through the pure chat index set.

The database 250 may also include TV program database 254, short TV program database 255, video advertisement database 256, user profile 257 and topic knowledge graph 258.

The TV program database 254 includes data about TV programs. An example of the format of the TV program data is <program Name, category, showing time, showing locations, actor list, description text of the program, related images, general comments, video file>, the "actor list" element may be further a list of elements, in which an example of each element is <actor real name, cast name, general images, images in the program, description text>.

A TV program is usually of a long time such as tens of minutes or more than one hour. The most impressive or interesting part of the program may be provided to the users for a quick review. The short TV program database 255 includes the tailored parts of the programs. In an implementation, the tailored short videos of the programs may be obtained manually. In another implementation, a video clipping module 264 is used to tailor out the abbreviations of the TV programs, which may be minute level or tens of seconds level short video clips. The format of the short TV program data in database 255 is similar with that of the TV program database 254, except that the video file in the TV program database 254 is replaced with a small file containing a short video. That is, an example of the format of the short TV program data is <program Name, category, showing time, showing locations, actor list, description text of the program, related images, general comments, short video file>.

The video advertisement database 256 includes data about advertisement videos. The format of the advertisement video data of the database 256 is similar as that of the short TV program database, and it further includes the information of the target product. That is, an example of the format of the advertisement video data is <program Name, category, showing time, showing locations, actor list, description text of the program, related images, general comments, short video file, product information>, where the term "program" in this tuple may be replaced with a term "advertisement".

It should be appreciated that the format of the database 254-256 is not limited to the illustrated examples, and there may be more or less elements in the format of the video data. It should be appreciated that the TV program data, the short TV program data and the advertisement video data may be collectively referred to as media data.

The user profile database 257 includes user data related to the usage of TV programs and/or advertisement videos. An example of the format of the user data is <user ID, TV program name or video advertisement name, emotional opinion, comment text, watched time>. It should be appreciated that there may be more or less elements in the format of the user data.

The topic knowledge graph 258 includes topic information related to TV programs and/or advertisement videos. In some implementations, the topic knowledge graph may be obtained from the text information such as the description of the program database 254 or 256. An example of a kind of topic knowledge is in the format of <entity, attribute, value>, which provides attribute information of the media content identified by the entity element. An example of another kind of topic knowledge is in the format of <topic, topic, similarity>, which provides similarity information between two entities.

The chatbot system 100 includes a recommendation module 260, a topic detection module 262, a video clipping module 264, a comments generation module 266 and a sentiment analysis (SA) module 268.

The topic detection model 262 is responsible for detecting the topics included in user input messages or queries. Specially, the topic detection model 262 determines whether the user wants to continue current topic or the user wants to start a new topic. For example, if user says "I want to see dragon ball", the topic detection model 262 may determine that it's a start of a new topic "dragon ball". After that query, if the user says "when is the latest episode?", then the topic detection model 262 may determine that it's a continue of current topic "dragon ball" and the user wants to know more detailed information about "showing time" of "dragon ball". Otherwise, if user says "any other cartoon?", then the topic detection model 262 may determine that it's a start of a new topic, that is, the user is trying to switch from "dragon ball" to some new "cartoon". The user intention of starting a new topic in the conversation between the chatbot and the user indicates an opportunity to recommend a media content, which may be a TV program or an advertisement video, for the user. The topic detection module 262 is used to identify such an opportunity, so as to recommend TV programs or video advertisement for the user at the right time.

The comments generation model 266 automatically generates comments for a specific actor or a specific TV program. It should be appreciated that the term "actor" refers to either actor or actress or singer or any kind of player in the disclosure. In an implementation, the comments generation model has two parts, one part is to generate comments for an actor in a general way, which is not directly related to current TV program, and the other part is to generate comments or recommendation reasons for a specific TV program. By providing the comments of the actor and/or TV program in the conversation between the chatbot and the user, it may interest the user to talk about the TV programs or actors with the chatbot, this makes it possible to collect more information about user's interest to the media content related topics, so as to figure out the user profile related to the media content.

The SA model 268 classifies users' comments for the TV programs as various emotional types, such as happy, sad, angry and so on. One application of the SA model is to capture users' interest about media contents, and such user interest data may be used to recommend more suitable TV programs or video advertisement to the user, so as to improve the user satisfaction rate of the recommended TV programs and video advertisements.

The video clipping module 266 is used to tailor out the excellent and impressive parts of a given TV program. When recommending a TV program in the conversation between the chatbot and the user, the tailored part of the TV program may be presented in the conversation for the user's quick preview.

The recommendation module 260 may be implemented with a Learning-to-rank (LTR) based recommendation algorithms, which is used to identify a TV program and/or video advertisement from the database 254 and/or 256.

Figure 3:
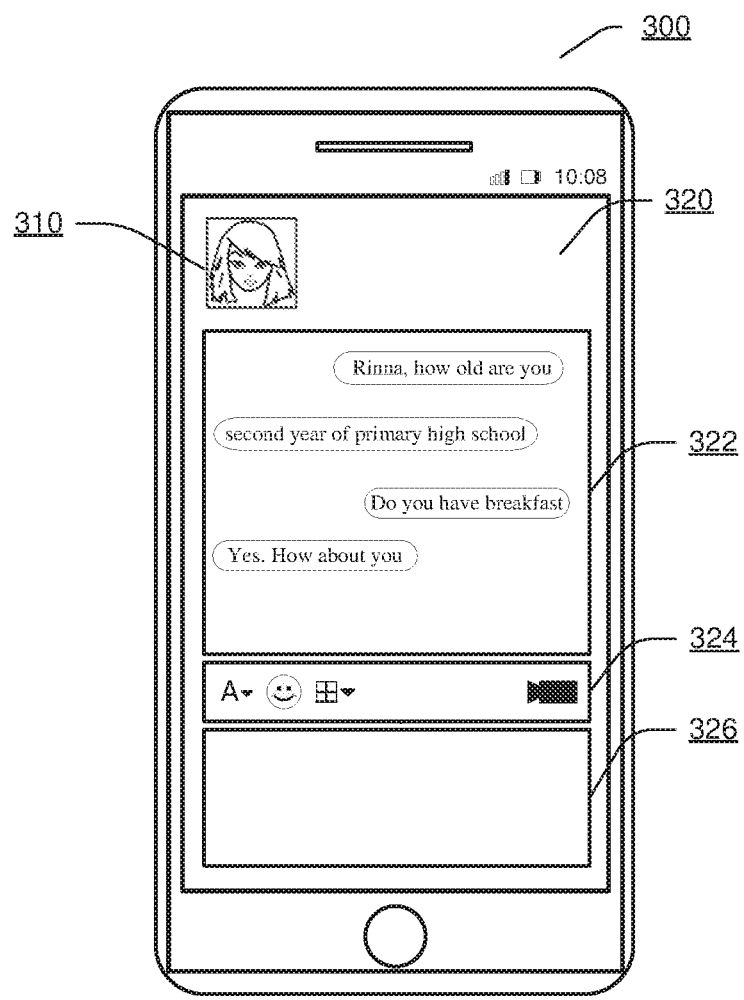
FIG. 3 illustrates an exemplary user interface (UI) according to an embodiment.

FIG. 3 illustrates an example of the UI 210. A chat window 320 is displayed on a computing device 300 such as a smart phone. The chat window 320 comprises a presentation area 322, a control area 324 and an input area 326. The presentation area 322 presents queries and responses in a conversation between a user and a chatbot, which is represented by the icon 310. The control area 324 includes a plurality of virtual buttons for the user to perform message input settings. For example, the user may make a voice input, attach image file, select emoji symbols, and make a short-cut of current screen, and so on through the control area 324. The input area 326 is used for the user to input messages. For example, the user may type text through the input area 326. The control area 324 and the input area 326 may be collectively referred to as input unit. The user may also make a voice call or video conversation with the AI chatbot though the input unit.

For example, in the UI as shown in FIG. 3, the a user inputs a message "Rinna, how old are you" as a query, and a message "second year of primary high school" may be output by the chatbot as a response. Similarly, the user inputs a message "do you have breakfast" as a query, and a message "Yes, How about you" may be outputted by the chatbot as a response. Here, Rinna is the name of the AI chatbot, which may also be referred to as AI chat system. It should be appreciated that the input of the messages may be in the form of speeches, and the illustrated text in the UI is just transcription of the speeches. It's also possible that even the transcription of the speeches is not displayed in the screen, and the conversation between the chatbot and the user is performed via speeches.

Although the computing device 300 is illustrated as a smart phone, it may be any other kind of the computing device such as the TV 130, the TV box 150, where the UI may be displayed on the TV 130 and the TV 154 connected with the TV box 150.

Figure 4:
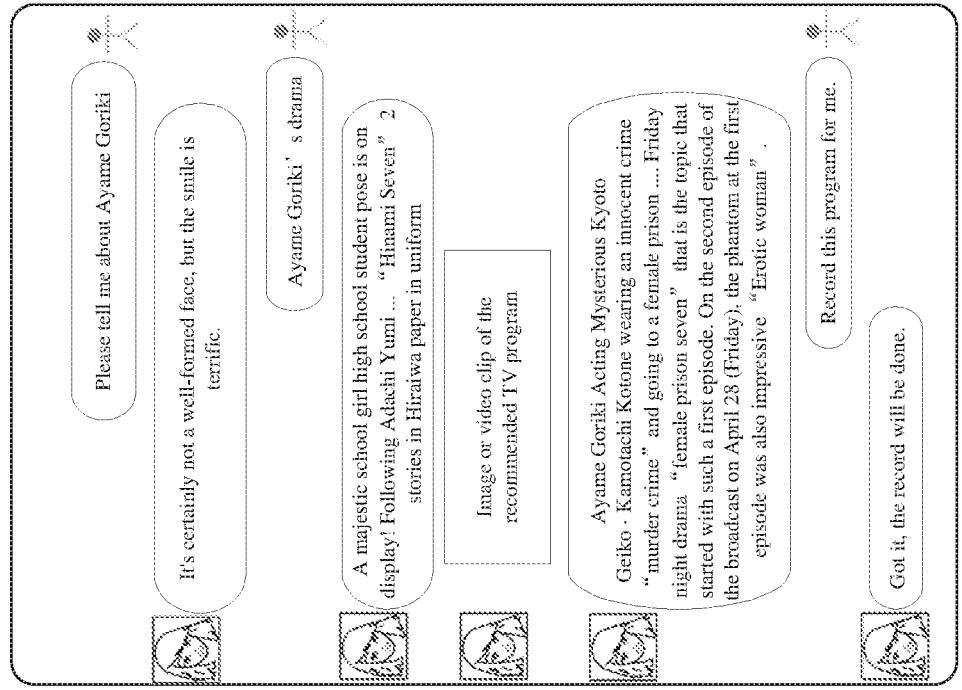
FIGS. 4-7 each illustrates an exemplary conversation flow according to an embodiment.

FIG. 4 illustrates an exemplary conversation flow between a chatbot and a user according to an embodiment.

Figure 6:
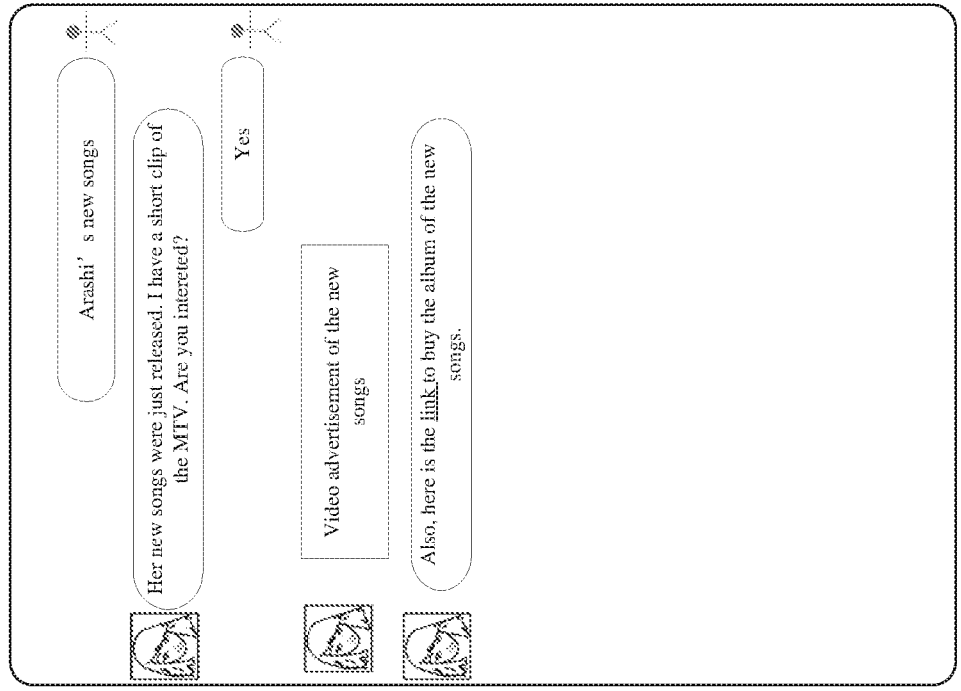

The conversation flow may be implemented in the UI 320 as illustrated in FIG. 3, only the presenting area 322 is illustrated in FIG. 6 for sake of clarity. The icon of the human shape at the right of the interface 400 denotes the user, and the icon of the young girl shape at the left of the interface 400 denotes the chatbot.

After the user inputs a message "music", the chatbot, specifically the topic detection module 262, may identify the user intention of starting a new topic related to media content such as TV program and video advertisement. Then the chatbot, specifically the recommendation module 260, may identify a music program based on the new topic of music. For example, the recommendation module 260 may score matching rates of candidate TV programs based on the topic and the user profile, and select the music program from the candidate TV programs based on the matching rates. In this illustrated example, the TV program that will show the actor Arashi's new songs is recommended to the user. In the illustrated example, a short introduction of the TV program, such as "Arashi will show new songs with M station! Austin Mahone will sing a funny piece of blouson chiemi!" is presented to the user, then a video clip or a representative image of the recommended TV program is presented for the user's quick review, and then a comments for the recommended TV program, such as "Austin Mahone of the American singer will appear for the first time on "Music Station" broadcasted on TV Asahi on April 28 (Friday)" is presented in the conversation, the comments for the recommended TV program may also be referred to as recommendation reasons for the recommended TV program. In another implementation, more or less information may be provided when providing the recommendation of the TV program, for example, comments for an actor of the recommended TV program may be provided when providing the recommendation of the TV program. Taking Arashi as an example, the comments for the actor, such as "Arashi is so popular for the young due to their handsome appearance and talented singing", may be provided to the user.

In response to the user's query about airtime, the airtime or broadcasting time is provided in the conversation. And in response to the user's feedback "book this program for me", the chatbot may book the program for the user. As an example of booking, the chatbot may set a reminder for the user in order to remind the user to watch the program shortly before the broadcasting time of the program. As another example of booking, the chatbot may send an instruction to the TV or TV box to preset the playing of the program, so that the TV or TV box may automatically change to program at the time of broadcasting. As another example of booking, the chatbot may only set a booking information in the user's booking list.

In another implementation, if the recommended program is on showing, the chatbot may play the program on the TV in response to a user's feedback such as "I want to watch this program".

Figure 5:
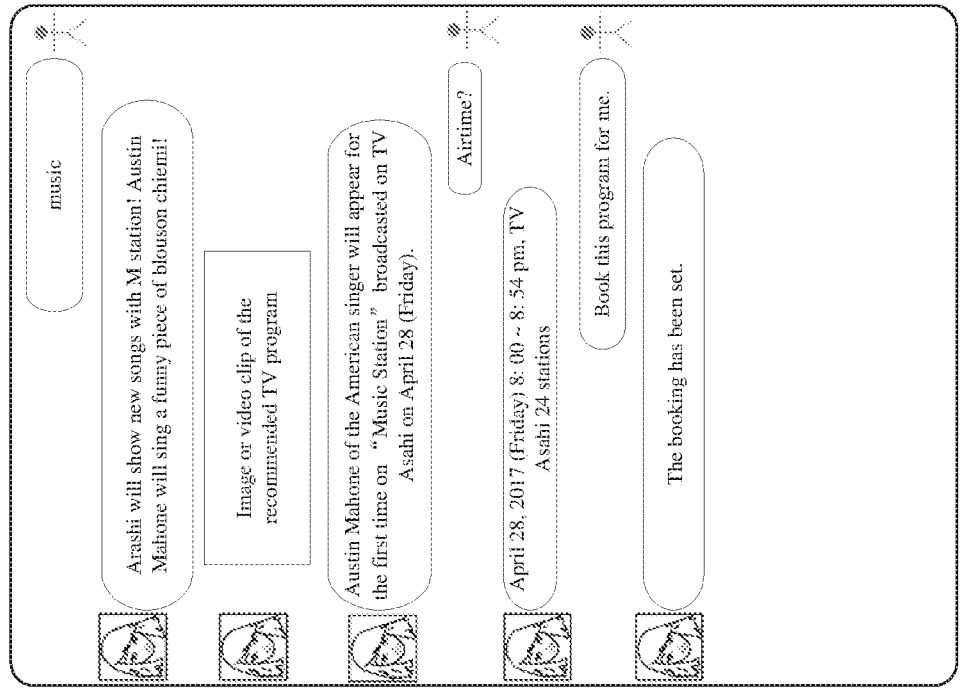

FIG. 5 illustrates an exemplary conversation flow between a chatbot and a user according to an embodiment.

After the user inputs a message "please tell me about Ayame Goriki", the chatbot may provide a response such as the comments for the actor "It's certainly not a well-formed face, but the smile is terrific".

After the user inputs a message "Ayame Goriki's drama", the chatbot, specifically the topic detection module 262, may identify a new topic related to media content such as TV program and video advertisement. Then the chatbot, specifically the recommendation module 260, may identify a drama program based on the new topic of Ayame Goriki's drama. Similarly, the recommended drama program may be identified based on scoring of matching rates of candidate TV programs. As illustrated in the chatting flow 500, a short introduction of the TV program, a video clip or a representative image of the recommended TV program, and comments or recommendation reasons for the recommended TV program are presented in the conversation.

In response to the user's feedback "record this program for me", the chatbot may preset a recording of this program in the TV or TV box, and respond to the user such as "Got it, the record will be done".

FIG. 6 illustrates an exemplary conversation flow between a chatbot and a user according to an embodiment.

After the user inputs a message "Arashi's new songs", the chatbot, specifically the topic detection module 262, may identify a new topic related to media content such as TV program and video advertisement. Then the chatbot, specifically the recommendation module 260, may identify a video advertisement based on the new topic of Arashi's new songs. Similarly, the recommended video advertisement may be identified based on scoring of matching rates of candidate video advertisements and TV programs. As illustrated in the chatting flow 600, the video advertisement of the new songs and the purchasing information of the advertisement, such as the links to buy the album of the new song, are provided in the conversation.

Figure 7:
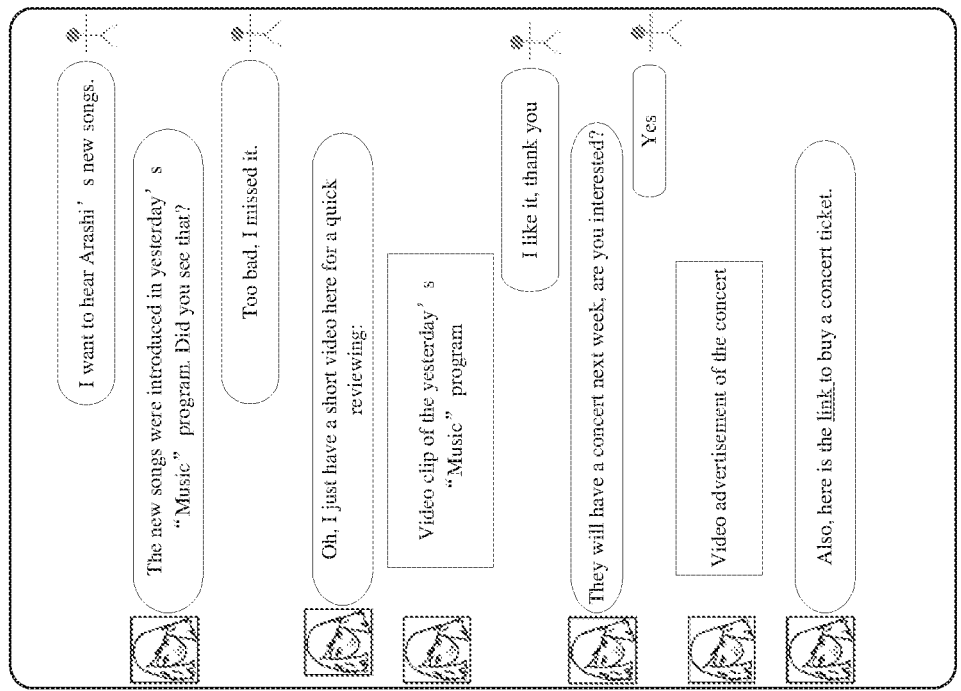

FIG. 7 illustrates an exemplary conversation flow between a chatbot and a user according to an embodiment.

After the user inputs a message "Arashi's new songs", the chatbot, specifically the topic detection module 262, may identify a new topic related to media content such as TV program and video advertisement. Then the chatbot, specifically the recommendation module 260, may identify that no TV program in the TV program database meets the user's requirement while a short video clip in the short TV program database is related to the user's topic, and a video advertisement of concert may be recommended to the user taking this opportunity. Then after several rounds of conversation as illustrated in the chatting flow 700, the video advertisement of the concert and the purchasing information of the advertisement are provided in the conversation. Compared with the conversation flow 600, the chatting flow 700 provides more soft talks before providing the video advertisement, and may be more acceptable for the user.

Figures 8, 8A, 8B:
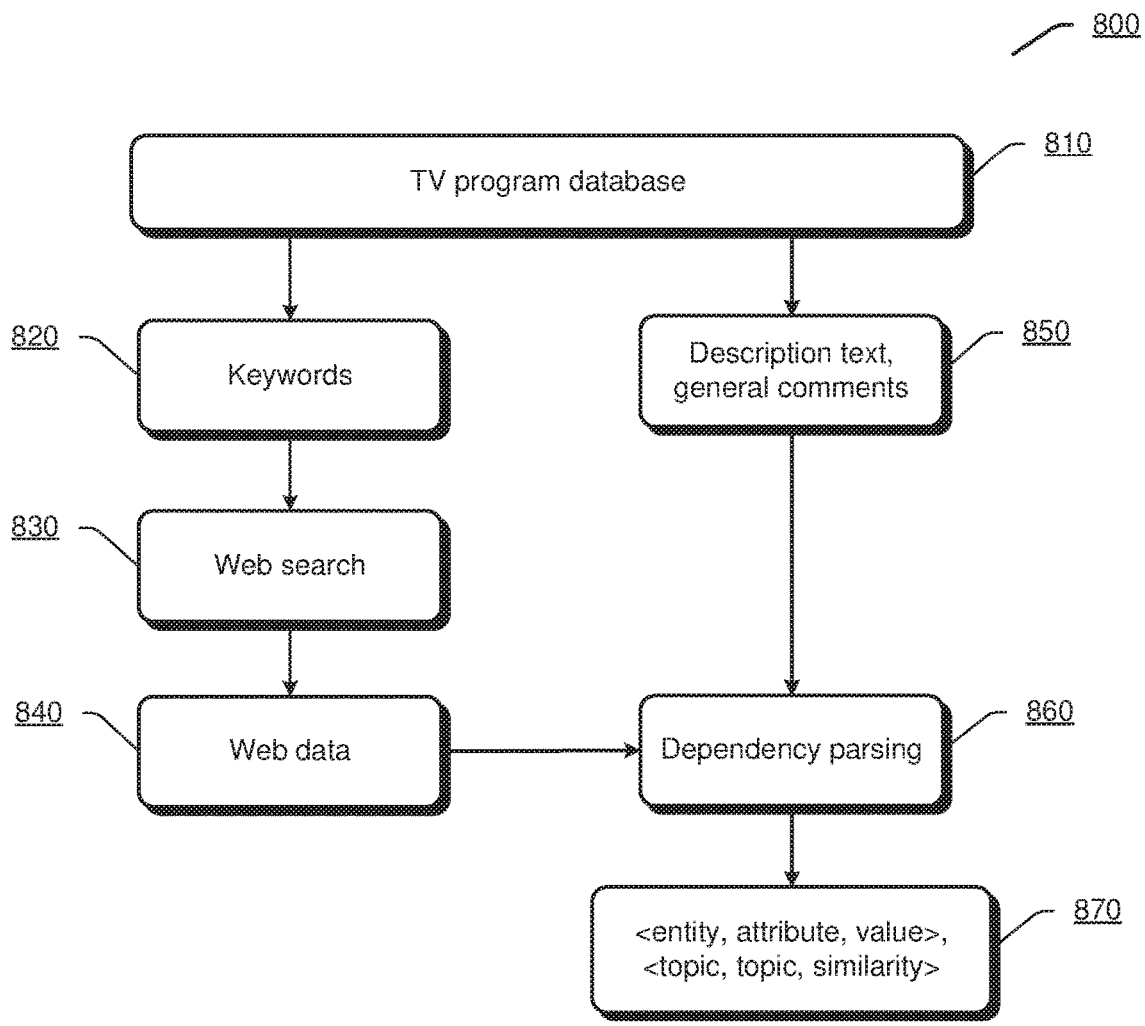
FIGS. 8-8B illustrates an exemplary process for collecting knowledge graph of TV programs according to an embodiment.

FIG. 8 illustrates an exemplary process for constructing a knowledge graph related to TV programs according to an embodiment.

Starting from the TV program database 810, the description text and general comments 850 contained in the TV program database may be used to extract knowledge graph in the format of tuples <entity, attribute, value> and <topic, topic, similarity>.

For example, the following data is recorded in the TV program database:

<program name=prison break season 5,
Category=Drama,
Showing time=The season premiered on Apr. 4, 2017, and airs on Tuesdays at 9:00 pm,
Showing location=US,
Actor list={Wentworth Miller as Michael Scofield, Dominic Purcell as Lincoln Burrows, Sarah Wayne Callies as Sara Scofield, . . . }
Description text=The fifth season of Prison Break (also known as Prison Break: Resurrection) is a limited event television series and the continuation of the original series created by Paul Scheuring that aired on Fox from 2005 to 2009. The season is produced by 20th Century Fox Television in association with Adelstein/Parouse Productions and Original Film. Paul Scheuring serves as showrunner, with himself, Marty Adelstein, Neal H. Moritz and Dawn Olmstead, Vaun Wilmott, Michael Horowitz and Nelson McCormick serving as executive producers. McCormick also serves as director. The season premiered on Apr. 4, 2017, and airs on Tuesdays at 9:00 pm. The first trailer of the series was released on May 16, 2016.

Image=Image list,

General comments=Linc's still tough and impulsive. Michael still has that lonely middle-distance stare. Tuesday's opener suggests there's plenty of action ahead, some real-world parallels, and a shaggy dog that could lead us to an interesting place. Hopefully that place will finally be closure.

Video file=Prison.break.season5.mp4>

Then, the following knowledge graph in a format of <entity, attribute, value> may be constructed:

<prison break season 5, show time, The season premiered on Apr. 4, 2017, and airs on Tuesdays at 9:00 pm.>
<prison break season 5, showing locations, US>
prison break season 5, actors, {Wentworth Miller as Michael Scofield, Dominic Purcell as Lincoln Burrows, Sarah Wayne Callies as Sara Scofield, . . . }>
<prison break season 5, images, image list>
<prison break season 5, comments, Line's still tough and impulsive . . . >
<prison break season 5, video file, prison.break.season5.mp4>
<prison break season 5, Description, The fifth season of Prison Break (also known as Prison Break: Resurrection) . . . >

On the other hand, for the description text and general comments in TV program database, dependency parsing is used to extract the syntactic relations among entities and its attributes as well as between a pair of entities that share a dependency arc.

FIG. 8A illustrates an example of dependency parsing for the sentence "Prison break's new season will be restarted by Fox". From this dependency parsing tree, the predicate "restarted by" can be used to link its subject and object arguments to obtain a tuple of <Fox, restart, Prison break's new season>. It should be appreciated that the dependency parsing may be performed by using existing technique, and the illustrated dependency parsing tree only illustrates the necessary arcs for sake of simplicity.

FIG. 8B illustrates an example of dependency parsing for the sentence "Compared with "prison break", "breaking bad" has relatively higher scored comments". In this example sentence, since "prison break" and "breaking had" are linked by a "dependency" arc, a tuple such as <prison break, breaking bad, dependency> is extracted to show that there is a topic relation between these two dramas.

Based on the collected <topic, topic, dependency> tuples, a similarity score of two topics may be computed. An example of computing similarity of topic A and topic B is as below:

$$\text{Similarity score } <A,B> = \text{number of } <A,B, \text{dependency}>/\text{number of } <A,x, \text{dependency}> + \text{number of } <A,B, \text{dependency}>/\text{number of } <y,B, \text{dependency}> \quad \text{Equation (1)}$$

Where x refer to any topic that has a dependency relation with topic A, and y refer to any topic that has a dependency relation with topic B.

For example, the number of <A, B, dependency> is 10, which indicates the same 10 tuples are collected, the number of <A, x, dependency> is 100, which indicates 100 tuples includes A, the number of <y, B, dependency> is 200, which indicates 200 tuples includes B, then the Similarity score <A, B>=10/100+10/200=0.15. Therefore a tuple <topic A, topic B, similarity=0.15> is obtained.

On the other hand, the knowledge graph in the formats of <entity, attribute, value> and <topic, topic, similarity> may be mined from web. At 820, the TV program database 810 may be used to supply related keywords, such as program name, category, actors, and so on. At 830, web search may be performed based on these keywords by using a search engine, to obtain related web data 840 for the TV programs. Then, the web data, such as the texts in the searched web pages, are parsed at 860 to obtain the related tuples in the formats of <entity, attribute, value> and <topic, topic, similarity>. The parsing of the web data is similar to the parsing as illustrated in FIGS. 8A and 8B.

it should be appreciated that the text data 840 and 850 may be collectively parsed at 860 to obtain the knowledge graph related to the TV program, which may then be used by the topic detection model 262.

In an implementation, the topic detection model takes current user query, current conversation session, the TV program database, and the knowledge graph as inputs. A conversation session may be defined by a flow of messages communicated in the conversation, where any two consecutive messages in a conversation session should be output within a predefined time distance such as 30 minutes. That is, if the user does not send anything in the exemplary 30 minutes from the chatbot's last response, then current conversation session ends. And when the user begins to send a message to the chatbot, a new session starts.

The output of the model is in a form of <topic word list, similarity score>, where the topic word list includes topic words contained in the current user query.

In an implementation, query complementation may be performed for a query before detecting topic words from the query. One part of the query complementation is coreference resolution, which is used to replace the coreferences in the queries, such as pronouns, one topic expressed by different strings, with the exact entity name. The other part of the query complementation is to complete the possibly missing parts such as subjects or objects in the queries. Taking the consecutive queries "I want to see dragon ball" and "when is the latest episode?", the query "when is the latest episode?" may be complemented as "when is the latest episode of the dragon ball?" based on the context of the conversation.

In an implementation, the list of topic words may be picked out from the current user query through text processing, which may include word segmentation, Part-of-speech (POS) tagging, noun phrase extraction, named entity recognition (NER). In another implementation, the list of topic words may be picked out by further using a term weighting algorithm such as TF-IDF (term frequency-inverse document frequency) while taking the knowledge graph and/or the TV program database as the data corpus or data collection. For example, the TF of a word indicates the term frequency of the word in the data corpus, and the IDF of the word indicates how many documents in the data corpus contain the word. A topic word may be given a weight based on the two factors. Typically, bigger TF leads to bigger weight and smaller IDF leads to bigger weight.

The similarity score in the output <topic word list, similarity score> is to show how close the current topic word list to the topics included in the current conversation session. In the training data, this "similarity score" takes a value of 1, which denotes going depth of one topic, or 0, which denotes going width from one topic to another new topic. In an implementation, a probability model is used, thus the output similarity score takes a value in the interval of [0, 1]. For example, when the score is larger than a threshold such as 0.5, it indicates a similar topic between the user query and the current conversation session, otherwise, it indicates a new topic of the user query. It should be appreciated that the output of the topic detection model may include similarity scores of the list of topic words, where the similarity score of the query may be obtained by summing the similarity scores of the topic words.

In an implementation, a logistic regression model is trained to classify the current query as new topic or not. The logistic regression model may be taken as a part of the topic detection model. At least part of the following features may be used ire the logistic regression model.

A feature that may be used in the logistic regression model is the number of shared topic words between the current conversation session's topic word list and the current query's topic word list.

A feature that may be used in the logistic regression model is the ratio of shared topic words between current conversation session's topic word list and the current query's topic word list over total number of topic words of the both. Specifically, the ratio=number of shared topic words/(number of current session's topic words+number of current query's topic words).

A feature that may be used in the logistic regression model is the closest knowledge graph distance of between words in the session topic word list and words in the current query topic word list. For example, for a topic word "breaking bad" in current query and a topic word "24 hours" in current session, as well as two tuples <breaking bad, prison break, 0.1> and <24 hours, prison break, 0.2>, the knowledge graph distance may be obtained as two hops or may be obtained as a matching probability of 0.02=0.1*0.2. The matching between topics via the tuples would lead more to classification of a new topic.

A feature that may be used in the logistic regression model is whether the words in current query topic word list are attributes of the words in current session topic word list. For topic words "breaking bad" in current session and "how many episodes" in current query, a tuple <breaking bad, number of episodes, 15> is triggered, that would lead more to classification of a similar topic.

A feature that may be used in the logistic regression model is whether the words in current query topic word list and words in current session topic word list belongs to the same category in the TV program database.

A feature that may be used in the logistic regression model is the minimum word2vec based cosine score of between words in the session topic word list and words in the current query topic word list.

Figure 9:
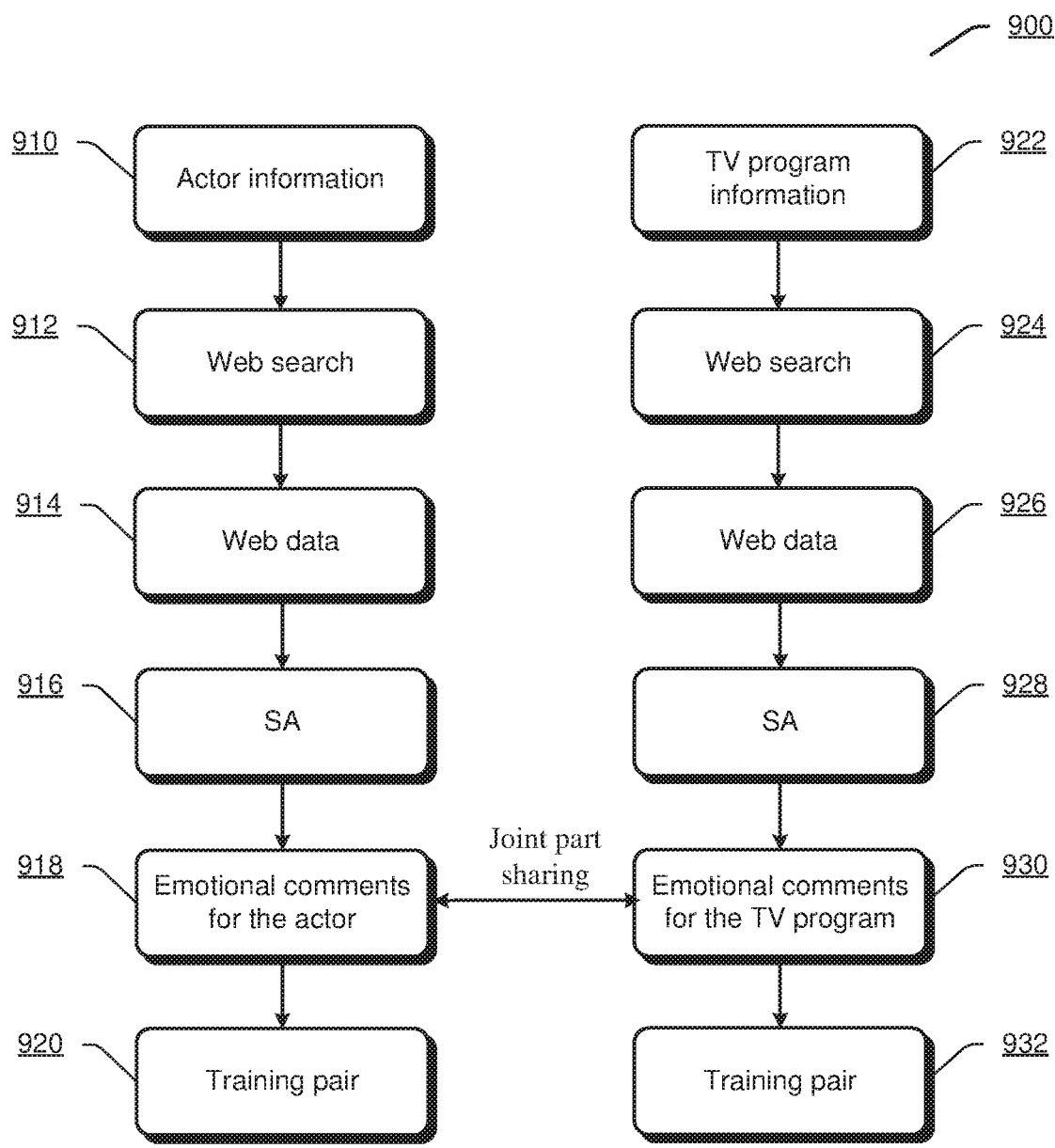
FIG. 9 illustrates an exemplary process for collecting training data according to an embodiment.

FIG. 9 illustrates an exemplary process for collecting training data used for the comments generation module 266 according to an embodiment.

The comments generation model has two parts, one part is to generate comments for an actor in a general way, and the other part is to generate comments or recommendation reasons for a given TV program. Each of the two parts may also be referred to as a comments generation module.

Actor information may be obtained from the TV program database at 910. Web search may be performed by a searching engine based on the actor information such as the actor names at 912, to obtain web data 914 related to the actors. Sentiment analysis may be performed on the web data at 916 to detect out emotional comments 918 for the actor. Then the general description of the actor and the emotional comments of the actor are taken as a training pair for training the comments generation module. The general description of the actor may be obtained from the TV program database, and may be obtained from the website, such as the actor's personal website, the entertainment company's website, the knowledge-based website and so on.

TV program information may be obtained from the TV program database at 922. Web search may be performed by a searching engine based on the program information such as the program names at 924, to obtain web data 926 related to the TV program. Sentiment analysis may be performed on the web data at 928 to detect out emotional comments 930 for the program. Then the general description of the program and the emotional comments of the program are taken as training pair for training the comments generation module. The general description of the program may be obtained from the TV program database, and may be mined from the website, such as the program provider's website, the knowledge-based web and so on. An exemplary training pair is <e="The fifth season of Prison Break (also known as Prison Break: Resurrection) is a limited event television series and the continuation of the original series created by Paul Scheuring that aired on Fox from 2005 to 2009.", f="Line's still tough and impulsive. Michael still has that lonely middle-distance stare">.

The emotional comments for one TV program are partially influenced by the emotional comments for the actors of the TV program. Also, the emotional comments for the actors are influenced by the emotional comments for the TV programs that the actors are engaged. Therefore in an implementation, the emotional comments of a TV program are taken as the emotional comments of actors in the TV program, and the emotional comments of actors in the TV program are taken as the emotional comments of the TV program, denoted as "joint part sharing", which is used to alleviate potential data sparseness.

Figure 10:
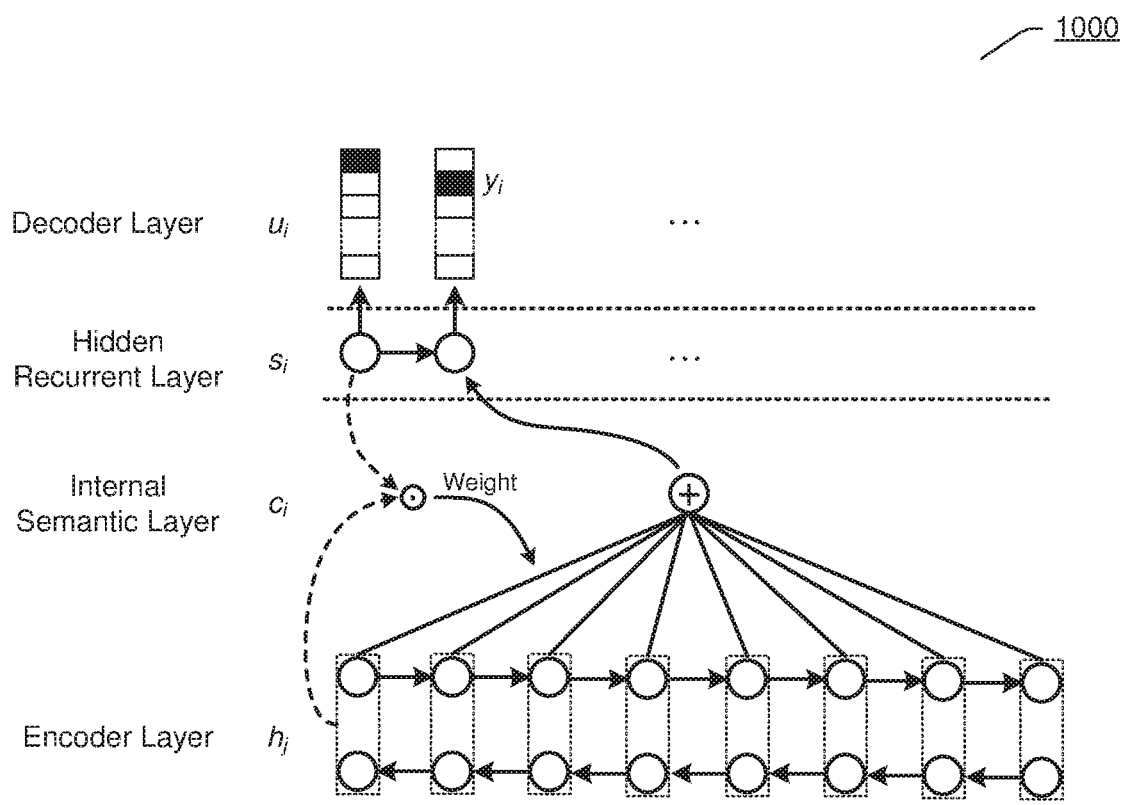
FIG. 10 illustrates an exemplary comments generation model according to an embodiment.

FIG. 10 illustrates an exemplary comments generation model according to an embodiment.

The comments generation model is implemented with attention-based encoding-decoding neural network model, which comprises an encoder layer, an internal semantic layer, a hidden recurrent layer, and a decoder layer.

At the encoder layer, bidirectional recurrent operations may be applied on an input sequence so as to obtain source vectors. The input sequence may be the description text in the above mentioned training pair, and accordingly the output sequence may be the comments in the training pair. There are two directions involved in the bidirectional recurrent operations, e.g., left-to-right and right-to-left. The bidirectional recurrent operations may be based on, such as, Gated Recurrent Unit (GRU) style recurrent neural networks. The source vectors may be denoted by temporal annotation $h_j$, where $j=1, 2, \ldots, T_x$, and $T_x$ is the length of the input sequence, e.g., the number of words in the input sequence. The source vectors $h_j$ may be obtained by using the following equations.

$$z_t = \sigma_g(W_z x_t + U_z h_{t-1} + b_z) \quad \text{Equation (2)}$$

$$r_t = \sigma_g(W_r x_t + U_r h_{t-1} + b_r) \quad \text{Equation (3)}$$

$$h_t = z_t \circ h_{t-1} + (1-z_t) \circ \sigma_h(W_h x_t + U_h(r_t \circ h_{t-1}) + b_h) \quad \text{Equation (4)}$$

Where

The symbol ○ denotes the Hadamard product.

$h_0 = 0$ $x_t$ denotes input vector.

$h_t$ denotes output vector.

$z_t$ denotes update gate vector.

$r_t$ denotes reset gate vector.

$\sigma_g$ denotes activation function, the original is a sigmoid function.

$\sigma_h$ denotes activation function, the original is a hyperbolic function.

W, U, b denote parameter matrices and vector. $W_z$ is a matrix that projects the input vector of $x_t$ into a vector space that follows $z_t$, $U_z$ is a matrix that projects the hidden layer (recurrent layer) of $h_{t-1}$ into a vector space that also follows $z_t$, and $b_z$ is a bias vector that tries to determine the relative position of the target vector of $z_t$. Similarly, $W_r$, $U_r$, and $b_r$ projects $x_t$, $h_{t-1}$ into the vector space of $r_t$.

At the internal semantic layer, an attention mechanism may be implemented. A context vector $c_i$ may be computed based on a set of temporal annotations $h_j$ and may be taken as a temporal dense representation of the current input sequence. The context vector $c_i$ may be computed as a weighted sum of the temporal annotations $h_j$ as follows:

$$c_i = \Sigma_{j=1}^{T} \alpha_{ij} h_j \quad \text{Equation (5)}$$

The weight $\alpha_{ij}$ for each $h_j$ may also be referred to as "attention" weight, and may be computed by a softmax function:

$$\alpha_{ij} = \frac{\exp(e_{ij})}{\sum_{k=1}^{T_x} \exp(e_{ik})} \quad \text{Equation (6)}$$

where $e_{ij} = a(s_{i-1}, h_j)$ is an alignment model which scores how well inputs around a position j and an output at position i match with each other. The alignment score is between a pervious hidden state $s_{i-1}$ and the j-th temporal annotation $h_j$ of the input sequence. The probability $\alpha_{ij}$ reflects importance of $h_j$ with respect to the previous hidden state $s_{i-1}$ in deciding the next hidden state $s_i$ and simultaneously generating the next word $y_i$. The internal semantic layer implements an attention mechanism through applying the weight $\alpha_{ij}$.

At the hidden recurrent layer, hidden states $s_i$ for an output sequence are determined through unidirectional, e.g., left-to-right, recurrent operations. The unidirectional recurrent operations may be performed by, such as, unidirectional GRU units. The computing of $s_i$ also follows the equations (2)-(4), where the $h_i$ is replaced with $s_i$.

At the decoder layer, word prediction for the next word $y_i$ may be determined as follows:

$$p(y_i|y_1, \ldots, y_{i-1}, x) = g(y_{i-1}, s_i, c_i) \quad \text{Equation (7)}$$

where $s_i$ is from the hidden recurrent layer, $c_i$ is from the internal semantic layer. Here, g(.) function is a nonlinear, potentially multi-layered function that outputs probabilities of the next candidate words in the output sequence. The decoder layer may also be referred to as an output layer. Therefore the trained generation model may generate comments for a TV program or comments for an actor from the general description of the TV program or the general description of the actor.

Figure 11:
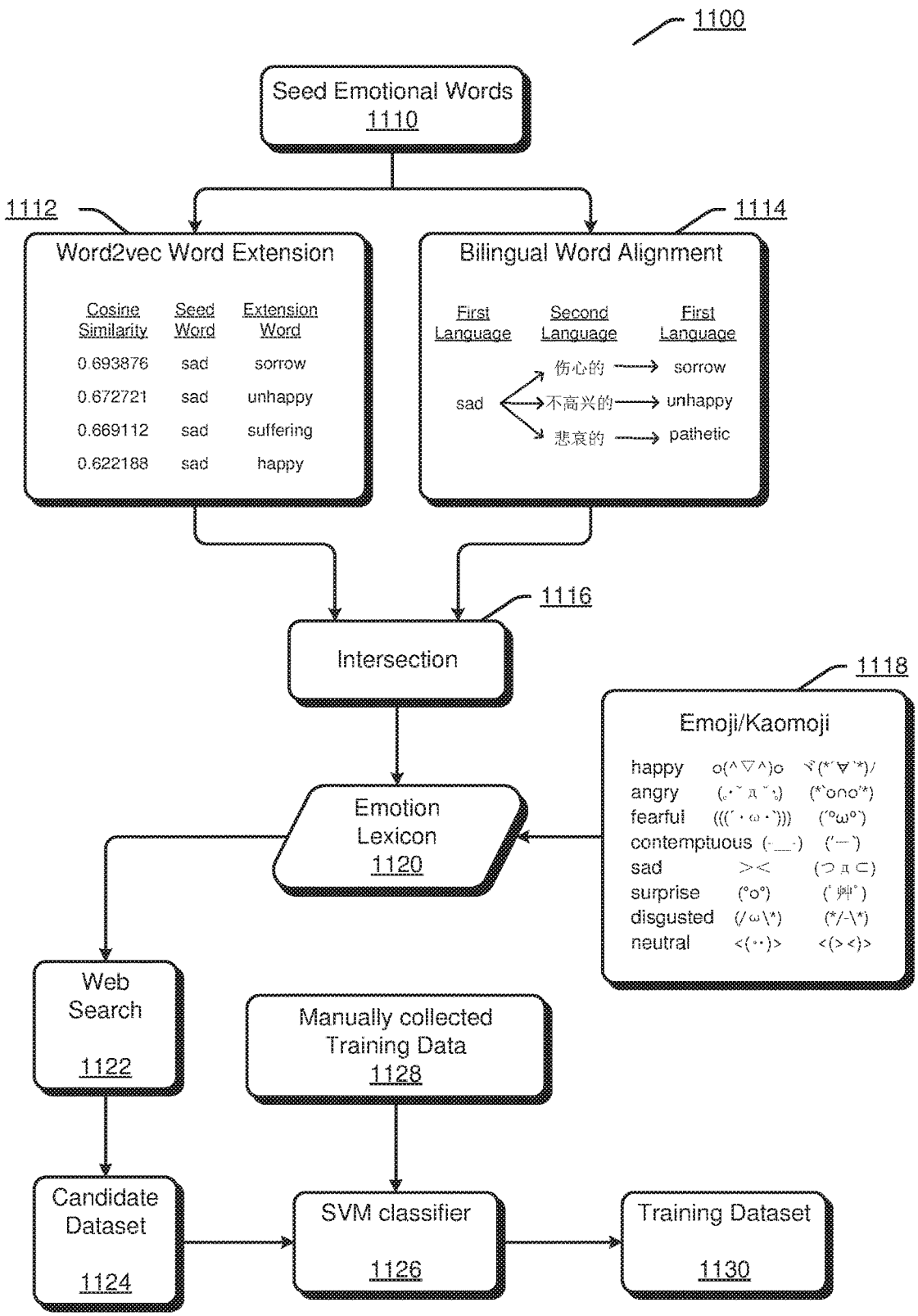
FIG. 11 illustrates an exemplary process for collecting training data according to an embodiment.

FIG. 11 illustrates an exemplary process 1100 for collecting training data for a sentiment analysis classifier according to an embodiment.

The process 1100 may be performed for generating an emotion lexicon by extending seed emotional words, and further determining a training dataset by using the emotion lexicon.

At 1110, seed emotional words may be obtained. Herein, the seed emotional words may include emotional words corresponding to each type of emotion. For example, the seed emotional words may include a plurality of words corresponding to the emotion "happy", such as, "happy", "pleased", "glad", "blessed", etc. The seed emotional words may be obtained from existing manually-constructed sentiment lexicons that contain words with manually-labeled emotional polarities. These manually-constructed sentiment lexicons can only provide a limited number of seed emotional words.

At 1112, a Word2vec word extension may be performed based on the seed emotional words so as to extend the seed emotional words. A Word2vec cosine similarity score for each seed emotional word and a word from a corpus may be computed. In this way, a number of words, from the corpus, with computed cores may be collected for each emotional word, and then a plurality of top-ranked words may be determined as extension to the seed emotional word. For example, as shown in FIG. 11, for the seed emotional word "sad", extension words "sorrow", "unhappy", "suffering", "happy", etc. may be determined based on the computed Word2vec cosine similarity scores.

It should be appreciated that Word2vec cosine similarity score is computed based on, such as, positions of words in sentences. Thus, the Word2vec word extension cannot ensure that all the extension words have a similar semantic meaning with the corresponding seed emotional word. For example, in FIG. 11, "happy" is determined as an extension word to the seed emotional word "sad", however, these two words have different semantic meanings. Thus, the process 1100 further comprises a pruning mechanism, which is based on bilingual word alignment, for removing those extension words having different semantic meanings or weak semantic relevance from corresponding seed emotional words.

At 1114, bilingual word alignment may be performed. The bilingual word alignment may be used for finding semantically relevant words to a seed word through a round-trip translating between two different languages. A seed emotional word in a first language may be translated into words in a second language. For example, the seed emotional word "sad" in English may be translated into words "伤心的", "不高兴的" and "悲哀的" in Chinese. Then, the words in the second language may be translated back into words in the first language. For example, the words "伤心的", "不高兴的" and "悲哀的" in Chinese may be translated back into words "sorrow", "unhappy" and "pathetic" in English. Thus, a list of words "sorrow", "unhappy" and "pathetic" may be obtained through the bilingual word alignment for the seed emotional "sad".

At 1116, an intersection operation may be performed on the extension words obtained by the Word2vec word extension at 1112 and the word list obtained by the bilingual word alignment at 1114. The intersection operation may be used for removing those extension words, obtained by the Word2vec word extension, having different semantic meanings or weak semantic relevance from corresponding seed emotional words. For example, in FIG. 11, through the intersection operation, the words "sorrow" and "unhappy" may be retained, while the word "suffering" having weak semantic relevance from "sad" and the word "happy" having different semantic meanings from "sad" are removed.

The retained words through the intersection operation may be appended to an emotion lexicon 1120. In an implementation, words in the emotion lexicon 1120 may be further added by corresponding emoticons, e.g., emoji or kaomoji. At 1118, emoji or kaomoji may be collected from the network for each type of emotions. For example, for the emotion "sad", its corresponding emoticons may include, such as, "><", "(つ д ⊂)", etc. Accordingly, these emoticons may be appended to the words "sad", "sorrow" and "unhappy" corresponding to the emotion "sad" in the emotion lexicon 1120.

As discussed above, the emotion lexicon 1120 is established by performing Word2vec word extension and bilingual word alignment on seed emotional words, and may include much more words than manually-constructed sentiment lexicons. The emotion lexicon 1120 may be used as keywords for performing web search at 1122, so as to find web data such as sentences that contain at least one word in the emotion lexicon 1120. Each of the sentences may be labeled by an emotion of a corresponding word in the emotion lexicon 1120 that this sentence contains. These sentences together with corresponding emotional labels may be used as candidate training data 1124.

In some cases, the candidate training data 1124 may comprise some interference sentences that have obscure emotions or are difficult to identify emotions. An exemplary interference sentence may comprise a word "not" or its equivalents, which may switch from an original emotion to a contrary emotion. Another exemplary interference sentence may comprise both positive words and negative words in a mixture way, such as, "praise first and then criticize". A support vector machine (SVM) classifier 1126 may be used for filtering out interference sentences from the candidate training data 1124. A set of classifier training data 1128 may be obtained for training the SVM classifier 480. Regarding emotions except "neutral", instances may be manually labeled for each type of emotion as classifier training data. Regarding the emotion "neutral", sentences that do not contain emotional words or emoji/kaomoji may be collected from the network as training data 1130.

Through the classifier training data, the SVM classifier 1126 may be trained as discriminating interference sentences from other sentences in the candidate training data 1124. The remaining sentences in the candidate training data 1124 may form a training dataset 1130 for training the sentiment analysis classifier.

It should be appreciated that the operations by the SVM classifier 1126 are optional in the process 1100. Thus, in an implementation, the operations by the SVM classifier 1126 may also be omitted from the process 1100, and accordingly the candidate training data 1124 may form the training dataset 1130 directly.

Figure 12:
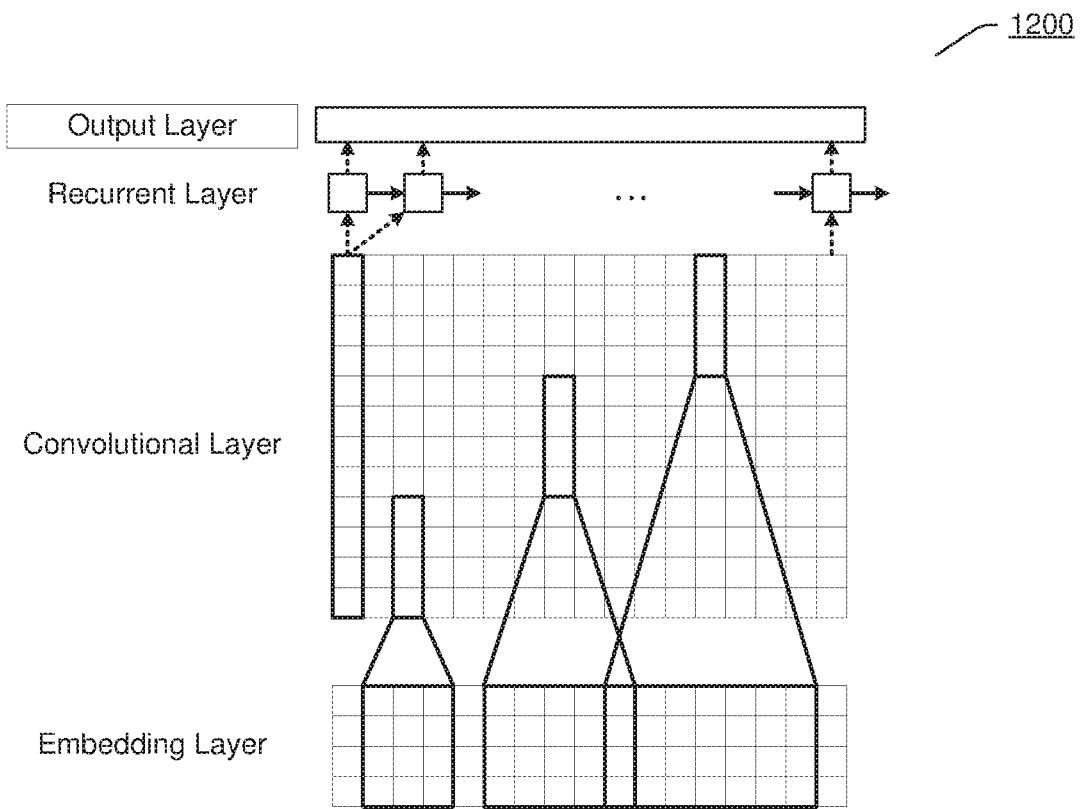
FIG. 12 illustrates an exemplary sentiment analysis classifier model according to an embodiment.

FIG. 12 illustrates an exemplary SA classifier 1200 according to an embodiment. The SA classifier 1200 is an example of SA model 268, and may be trained by the training dataset obtained in FIG. 11.

The SA classifier 1200 may be based on a character-level recurrent convolutional neural network (RCNN). The character-level RCNN is capable of encoding both semantic and orthographic information from characters. The character-level RCNN may comprise an embedding layer, a convolutional layer, a recurrent layer and an output layer.

The embedding layer may convert a sentence into dense vector space, e.g., generating an emotion vector for each character in the sentence.

Thu convolutional layer may be based on a CNN, and may perform convolution operations on the emotion vectors from the embedding layer, e.g., converting the emotion vectors with various kernel sizes.

Let $Q \in \mathbb{R}^{d*|V|}$ be a character embedding matrix with d being the dimensionality of character embedding and V being a character vocabulary set. It is assumed that a word $w=c_1,\ldots,c_l$, which has l characters. Then, a character-level representation of w is given by a matrix $C^w \in \mathbb{R}^{d*l}$, where the j-th column of $C^w$ corresponds to a character embedding for $c_j$ which is further the $c_j$-th column of Q. A narrow convolution is applied between $C^w$ and a filter or convolutional function $H \in \mathbb{R}^{d*f}$ with a width f. FIG. 12 shows three exemplary filters with widths f=3, 5 and 7. Then, a bias is added, and a nonlinearity transformation is applied to obtain a feature map $f^w \in \mathbb{R}^{l-f+1}$. The i-th element of $f^w$ may be given as:

$$f^w[i]=\tanh(<C^w[*,i:i+f-1],H>+b) \quad \text{Equation (8)}$$

where $C^w[*, i:i+f-1]$ is the i-to-(i+f-1)-th columns of $C^w$, and $<A, B>=\text{Tr}(AB^T)$ is a Frobenius inner product.

In an implementation, the CNN at the convolutional layer may adopt, such as, a max pooling over time.

The recurrent layer may perform recurrent operations on outputs of the convolutional layer. It should be appreciated that, although FIG. 12 shows unidirectional recurrent operations in the recurrent layer, bidirectional recurrent operations may also be applied in the recurrent layer. The recurrent layer may also be referred to as a RNN layer, which may adopt long-short term memory (LSTM) units. The LSTM may address a learning problem of long distance dependencies and a gradient vanishing problem, through augmenting a traditional RNN with a memory cell vector $c_t \in \mathbb{R}^n$ at each time step. One step of the LSTM takes $x_t$, $h_{t-1}$, $c_{t-1}$ as inputs and produces $h_t$, $c_t$ via the following intermediate calculations:

$$i_t=\sigma(W^i x_t + U^i h_{t-1} + b^i) \quad \text{Equation (9)}$$

$$f_t=\sigma(W^f x_t + U^f h_{t-1} + b^f) \quad \text{Equation (10)}$$

$$o_t=\sigma(W^o x_t + U^o h_{t-1} + b^o) \quad \text{Equation (11)}$$

$$g_t=\tanh(W^g x_t + U^g h_{t-1} + b^g) \quad \text{Equation (12)}$$

$$c_t=f_t \otimes c_{t-1} + i_t \otimes g_t \quad \text{Equation (13)}$$

$$h_t=o_t \otimes \tanh(c_t) \quad \text{Equation (14)}$$

where $\sigma(.)$ and $\tanh(.)$ are elementwise sigmoid and hyperbolic tangent functions, $\otimes$ is an elementwise multiplication operator, and $i_t$, $f_t$, $o_t$ denote input gate, forget gate and output gate respectively. When t=1, $h_0$ and $c_0$ are initialized to be zero vectors. Parameters to be trained in the LSTM are the matrices $W^i$, $U^j$, and the bias vector $b^i$, where $j \in \{i, f, o, g\}$.

The output layer may use RNN states from the recurrent layer as feature vectors, and output emotion classification results. For example, the output layer may be a full connection layer that can convert a 256-dimension vector from the recurrent layer to an output of 8-dimension vector which corresponds to 8 types of emotions. In an implementation, the 8 types of emotions include happy, surprise, anger, disgust, sad, contempt, fear and neutral. In an implementation, the SA classifier may be used to collect the emotional comments at 916 and 928. In an implementation, the SA classifier may be used to classify users' comments and opinions to the target TV programs.

Figure 13:
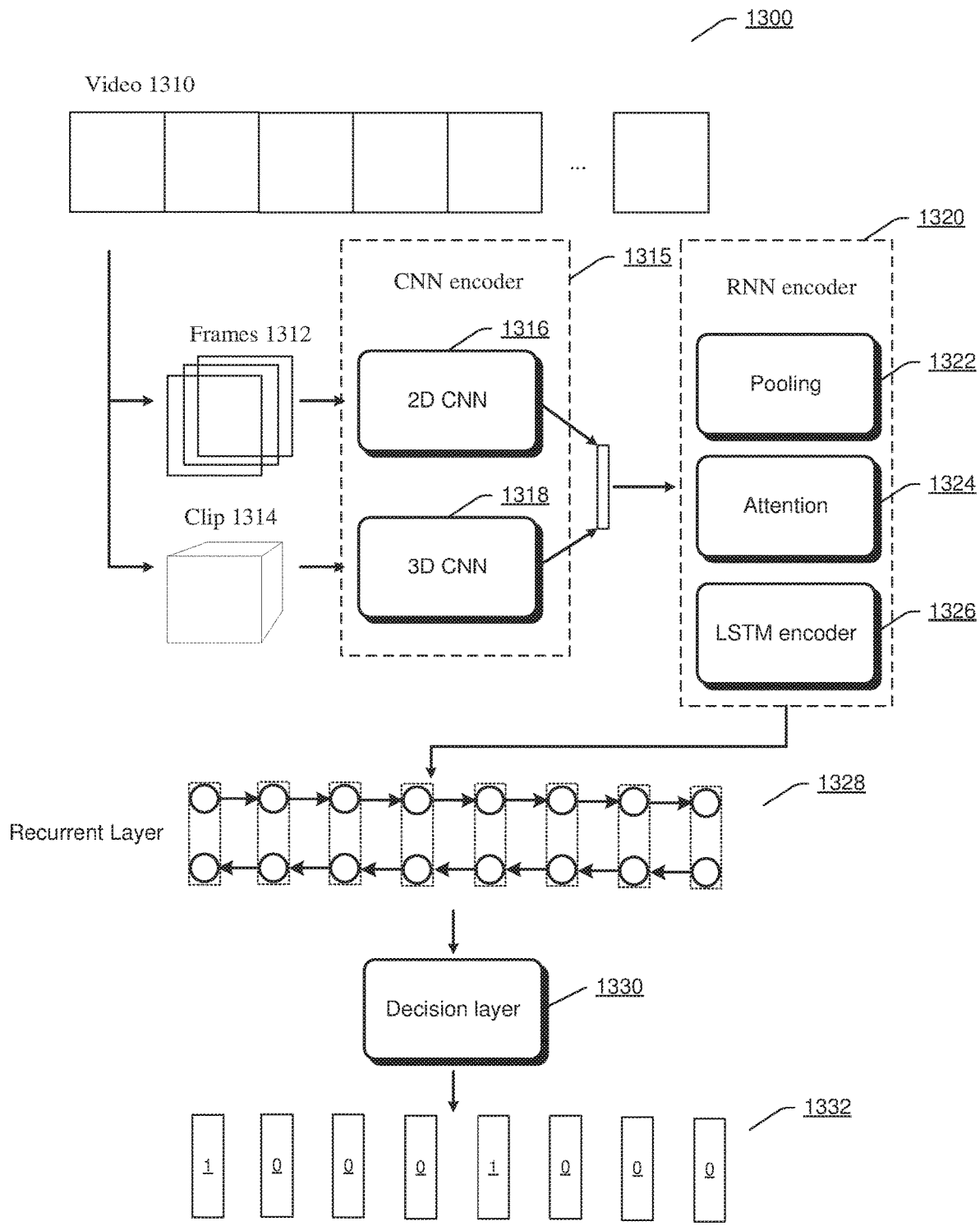
FIG. 13 illustrates an exemplary short video generation model according to an embodiment.

FIG. 13 illustrates an exemplary RCNN structure 1300 for tailoring out short video from a long video according to an embodiment. The RCNN structure 1300 is an example of video clipping module 264.

A video 1310 composed of frames are divided into short interval clips 1314. The clips may be of fixed time interval such as several seconds. In an implementation, clips 1314 and corresponding frames 1312 are send to a three dimension (3D) CNN and a 2D CNN, which encode the clips into dense vector representations. It should be appreciated that the CNN encoder 1315 composed of the 2D CNN 1316 and 3D CNN 1318 may be implemented by using existing techniques, therefore the detailed structure of the 2D CNN 1316 and 3D CNN 1318 is not described here for sake of simplicity. It should be appreciated that any techniques that can encode video clips into vectors are applicable in the disclosure.

An exemplary structure of the RNN encoder 1320 comprises a pooling layer 1322, an attention layer 1324 and a LSTM encoding layer 1326, each of the layers may be implemented by using existing techniques, therefore the detailed structure of the layers is not described here for sake of simplicity. The vectors obtained through the CNN encoding are sent to the RNN encoder 1320 to capture the contextual information of the vectors corresponding to the clips 1314.

Then a bi-directional RNN layer 1328 is used to link together the vectors for the clips 1314. The bi-directional RNN layer 1328 may be implemented with LSTM or GRU units.

A decision layer 1330 is used to classify the vectors as 0 or 1. The decision layer may be implemented as a softmax layer. When the softmax layer predicates a 0 label for one vector, then that vector is not kept, and when the softmax layer predicates a 1 label for one vector, then that vector is kept. Therefore the clips may be selected out to keep in the tailored short video.

The training data for this generation model may be in a format of <full video file, selected impressive short video file>. The selected impressive short video files may be manually tailored. And the manually tailored short videos may be collected from those short videos which are used for foreshowing the related programs.

Figure 14:
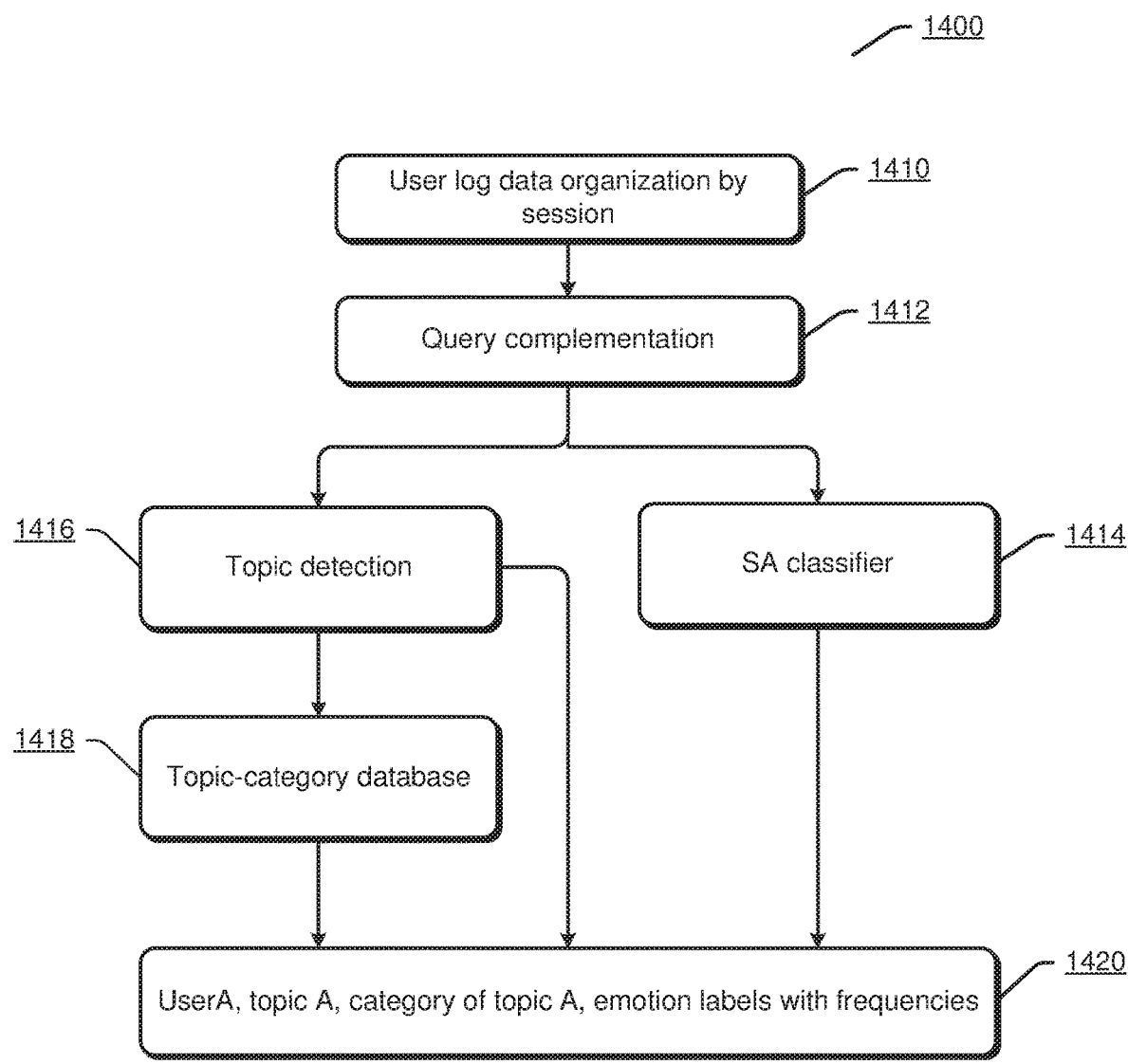
FIG. 14 illustrates an exemplary process for obtaining user profile data according to an embodiment.

FIG. 14 illustrates an exemplary process 1400 for obtaining user profile from user log data.

The user log data record the conversation history of a user with the chatbot, and are typically in the form of <query, response> pairs. The user log data may also include other information such as the watching time of programs. At 1410, the user log data 1410 are organized by conversation sessions. As discussed above, any two consecutive queries in one session are within a predetermined time interval such as 30 minutes.

At 1412 query complementation is performed on queries in a session based on the context of a session. One part of the query complementation is coreference resolution, which is used to replace the coreferences in the queries, such as pronouns, one topic expressed by different strings, with the exact entity name. The other part of the query complementation is to complete the possibly missing parts such as subjects or objects in the queries.

At 1416, topic detection is performed for each query to extract the topics. The query complementation and topic detection are similar to that described above with reference to the topic detection model.

At 1414, SA classification is performed for each query to obtain the SA label of a query as well as the SA label of the topics in the query.

For example, for a query such as "I like that movie Manchester by the sea, Sasey Affleck this time acts better than his brother", the knowledge of the user <user A, like, Manchester by the sea>, <user A, like, Sasey Affleck> may be obtained, where "Manchester by the sea" is a movie name, and "Sasey Affleck" is an actor's name. These types of knowledge may help build an updated user profile with user's liked list of actors and liked list of programs.

At 1418, the category of the detected topic is identified based on the existing topic-category database, which include predefined categories such as movie, music, actor or the like. A category may also include subcategory, for example, the category of movie may include subcategories such as comedy, tragedy, romantic or the like.

At 1420, an exemplary knowledge of the user may be obtained with the format such as <User A, topic A, category of topic A, emotion labels with frequencies). The emotion labels with frequencies may indicate the emotion of the user A regarding the topic A and the number of times such emotion of user A regarding topic A is detected. The knowledge of the user may be used as user profile, which may provide the user's tendency to specific programs and actors.

it should be appreciated that the user profile may also include the user's emotion or probability for a specific category or a specific actor. For example, if the user gives good comments to a specific category for one or more times, the probability of the specific category for this user will be given a higher score. The score may be determined based on the SA result and based on the number of times that the user's specific emotion to the specific category is detected. the user gives good comments to a specific actor for one or more times, the probability of the actor for this user will be given a higher score. Therefore, knowledge such as <user A, category, probability>, <user A, actor, probability> and so on may also be included in the user profile.

It should be appreciated that the user knowledge 1420 may also include other information, such as, the user A's comments to the topic A, the user's watch time for the topic A.

A learning-to-rank (LTR) based TV program and video advertisement recommendation algorithm may be used for the recommendation module 260, to rank available TV programs and video advertisements to a specific user under a specific query. A gradient boosting decision tree (GBDT) may be trained for the ranking. The ranking may be based on the user profile, the TV programs and video advertisement, the current query, the session and so on. At least a part of the following features may be used for the GBDT algorithm.

One feature that may be used for the GBDT is the output from the topic detection model 262. The output includes a list of topic words of the current query and similarity scores of topic words of current query compared with current conversation session. The similarity score of the current query may be achieved by summing up the similarity scores of the topic words. It should be appreciated that the similarity score of current query may also be output from the topic detection model. When the similarity score indicates a width extension from current topic to a new topic, it's an opportunity to recommend the new mentioned TV program and/or related video advertisements. In an implementation, the similarity score of the current query is used as a decision factor, where the following ranking is performed only when the similarity score indicates a new topic related to a media content. In another implementation, the similarity score of the current query is used as a weighting factor, a higher weight may be given for the current query if the new topic related to a media content is indicated, so that the overall ranking score may be increased and thus the recommending possibility would be increased if the current query relates to a new topic.

One feature that may be used for the GBDT is the category of the TV program. In an aspect, if the category of a candidate program matches the category of the topics mentioned in the query, the candidate program is given a higher ranking score. For example, if the user is talking about a movie such as "Star War", then the category of "movie" or "sci-fi movie" is given a higher score. In another aspect, different categories related to a specific user may be given different scores. For example, the specific user likes a first category such as movie more than a second category such as music, then the first category has a higher score than the second category in the user's profile. In the case of the topic of the query involves an actor who relates to both the first and the second categories, then the first category is given a higher ranking score than the second category based on the user profile.

One feature that may be used for the GBDT is the list of actors of the TV program or video advertisement. In an aspect, if one or more actors of a candidate program match the actor information of the topics mentioned in the query, the candidate program is given a higher ranking score. In another aspect, different actors related to a specific user may be given different scores. For example, the specific user likes a first actor more than a second actor, then the first actor has a higher score than the second actor in the user's profile. Then a program having the first actor is given a higher ranking score than a program having the second actor based on the user profile.

One feature that may be used for the GBDT is the liked actor list of the user and the number of shared actors of user's liked list with the actor list of the TV program or video advertisement. In an aspect, the program or video advertisement having one or more of the liked actors of the user would be given a higher ranking score. In another aspect, the more shared actors of user's liked list with the actor list of the TV program or video advertisement, the higher ranking score is given to the program or video advertisement.

One feature that may be used for the GBDT is the word2vec similarity of between the comments of a TV program and the comments of an actor in the TV program. The word2vec similarity may be computed as a cosine distance between the both comments in the vector space. This feature takes consideration of the inconsistence between the rating of the program and the rating of some actors in the program. For example, if the program gets low rate comments while an actor in the program gets high rate comments, where this inconsistence may be indicated by the word2vec similarity, the ranking score of this program may be increased to some extent. If the program gets high rate comments while an actor in the program gets low rate comments, where this inconsistence may be indicated by the word2vec similarity, the ranking score of this program may be decreased to some extent.

One feature that may be used for the GBDT is the emotion classification of the current conversation session. The emotion classification of the program may be predefined or may be obtained by performing sentiment analysis on the comments or description of the program with the SA model, while the emotion classification of the program may be obtained by performing sentiment analysis on the contents of the current conversation session with the SA model. A program whose emotion is suitable for the current emotion of the user may be given a higher ranking score. For example, if the SA model determines that the user is sad based on the current conversation session, a program that fits the sad emotion is given a higher ranking score, such as a happy movie.

One feature that may be used for the GBDT is the interested topics and related emotions of the topics in the user profile. An example of the user profile is <user, topic, emotion>, then the emotion score is used to give a weight for the topic detected from user's current query. An example of the emotion score may be frequency of the emotion for a specific topic.

One feature that may be used for the GBDT is bidding data, such as, the bidding price of keywords related to a video advertisement or related to a TV program like an entertainment program.

One feature that may be used for the GBDT is Word ngrams such as unigrams and bigrams for words in the query. This is a string based feature. The matching between the query and the candidate program or advertisement is performed in units of the word ngrams.

One feature that may be used for the GBDT is character ngrams. This is also a string based feature. For each word in the query, character ngrams are extracted to perform the string based matching between the query and the candidate program or advertisement. For example, 4-grams and 5-grams are used as the string based matching unit. The character ngrams is particularly advantages for Asian language such as Chinese and Japanese.

One feature that may be used for the GBDT is word skip-grams. For all the trigrams and 4-grams in the query, one of the words is replaced by a symbol to indicate the presence of non-contiguous words.

One feature that may be used for the GBDT is Brown cluster ngrams. Brown clusters are used to represent words in query, and then unigrams and bigrams are extracted.

One feature that may be used for the GBDT is Part-of-speech (POS) tags. The presence or absence of part-of-speech tags are used as binary features.

One feature that may be used for the GBDT is Social network related words. For example, number of hashtags, emoticons, elongated words, and punctuations in the query are used as features.

One feature that may be used for the GBDT is Word2vec cluster ngrams. The word2vec tool (Mikolov et al., 2013) may be used to learn 100-dimensional word embedding from a social network dataset. Then, K-means algorithm and L2 distance of word vectors may be used to cluster the million-level vocabulary into 200 classes. The classes are used to represent generalized words in the query.

It should be appreciated that the above discussed features for the GBDT are illustrative rather than limitative, there may be more or less features to be used for the GBDT.

Figure 15:
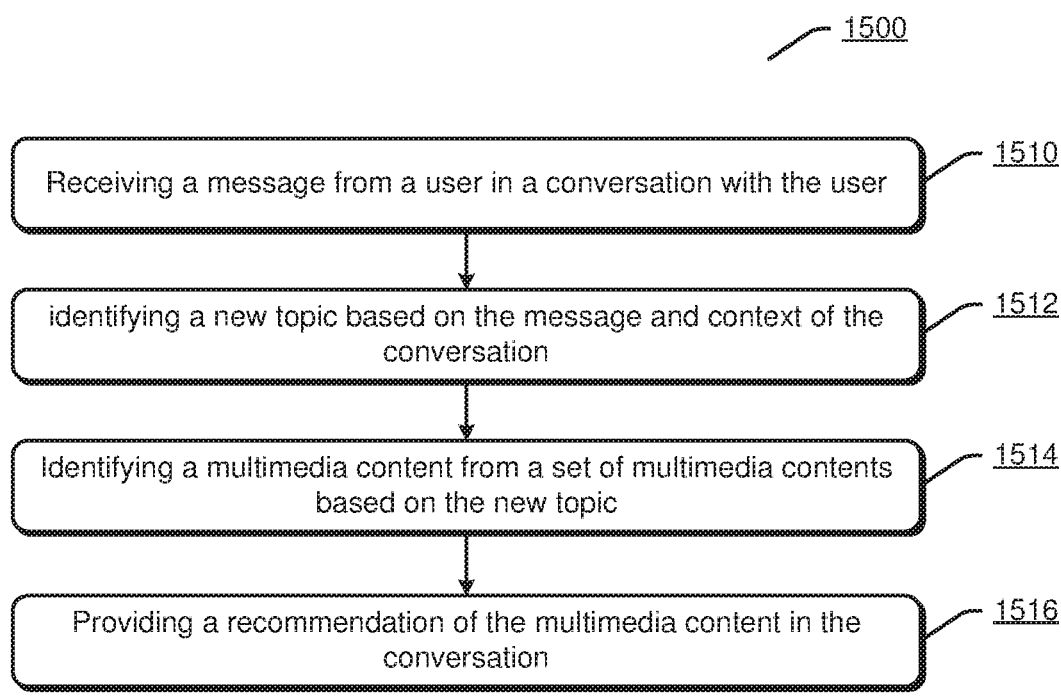
FIG. 15 illustrates an exemplary process for recommending media content through intelligent automated chatting according to an embodiment.

FIG. 15 illustrates an exemplary process 1500 for recommending media content through intelligent automated chatting.

At 1510, a message is received from a user in a conversation with the user.

At 1512, a new topic related to media content is identified based on the message and context of the conversation. For example, the new topic may be a media category such as music, drama or the like, an actor, a program name, or the like, which is related to media content.

At 1514, a media content is identified from a set of media contents based on the new topic. The identified media content may be a TV program, which may be of any media category such as music, movie, drama and so on. The identified media content may also be a video advertisement, which may be played by some actors, and may be related to some topics.

At 1516, a recommendation of the media content is provided in the conversation.

In an implementation, the new topic is identified based further on a knowledge graph related to the set of media contents. In an implementation, the knowledge graph comprises a first kind of data indicating attributes of the media contents and a second kind of data indicating similarity between media contents.

In an implementation, the media content is identified from the set of media contents by scoring matching rates of at least part of the set of media contents based on the new topic and a user profile of the user, and selecting the media content from the set of media contents based on the matching rates. In an implementation, the user profile comprises at least one of topics such as program names, the categories of the topics, actors of the topics, user emotion to the topics, user emotion to the actors. In an implementation, the user profile comprises categories and user emotions to the categories. In an implementation, the user profile comprises actors and user emotions to the actors. In an example, the liked actors and/or liked media contents of a specific user may be obtained from the user profile, either directly recorded in the user profile or can be derived from the user profile.

In an implementation, the matching rates are scored based further on at least one of: a knowledge graph related to the set of media contents, the user's emotion in the context of the conversation, and bidding information of at least one of the set of media contents. In an implementation, the knowledge graph of a media content comprises at least one of actors of the media content, user comments to the media content, and user comments to actors of the media content, category of the media content, broadcasting time of the media content.

In an implementation, the media content comprises at least one of a television program and a video advertisement.

In an implementation, in response to the user's feedback to the recommendation, the television program may be played on the TV or TV box, or the television program may be booked, or the television program may be recorded on the TV or TV box.

In an implementation, the providing a recommendation of the media content comprises providing at least one of: comments for an actor of the media content; comments for the media content; a representative image of the media content, or a short video clip of the media content, or the media content itself; and broadcasting information like broadcasting time and channel related to the television program or purchasing information related to the video advertisement.

In an implementation, the comments for the actor are generated from a description text about the actor by using a first neural network model, the comments for the media content are generated from a description text about the media content by using a second neural network model, the short video clip is generated from the media content by using a third neural network model.

In an implementation, the first neural network model is trained by using data pairs in the form of <description of an actor, emotional comments of the actor>, the second neural network model is trained by using data pairs in the form of <description of a program, emotional comments of the program>. In an implementation, the emotional comments of the actor are collected by performing sentiment analysis on web data related to the actor by using a SA model, the emotional comments of the program are collected by performing sentiment analysis on web data related to the program by using the SA model.

In an implementation, the third neural network model comprises a convolution neural network (CNN) part and a recurrent neural network (RNN) part. The short video clip is generated by: dividing the media content into a plurality of clips; mapping the plurality of clips into a plurality of vectors through the CNN; identifying a part of vectors through the RNN; and generating the short video clip based on the part of vectors, which represents the clips that would be remained in the short video clip.

In an implementation, the SA model is trained by using raining data in the form of <sentence, emotion label>. In an implementation, the training data are collected by: performing word2vec word extension to seed emotional words to obtain a first extended word list; performing bilingual word alignment to seed emotional words to obtain a second extended word list; taking intersection of the first and second extended word lists to obtain an emotion lexicon; obtaining candidate training dataset through web search based on the emotion lexicon; and obtaining the training dataset by performing a SVM classification on the candidate training dataset with a SVM classifier. The SVM classifier may be trained by using manually collected training data, for example, 1000 data instances for each emotion category.

Figure 16:
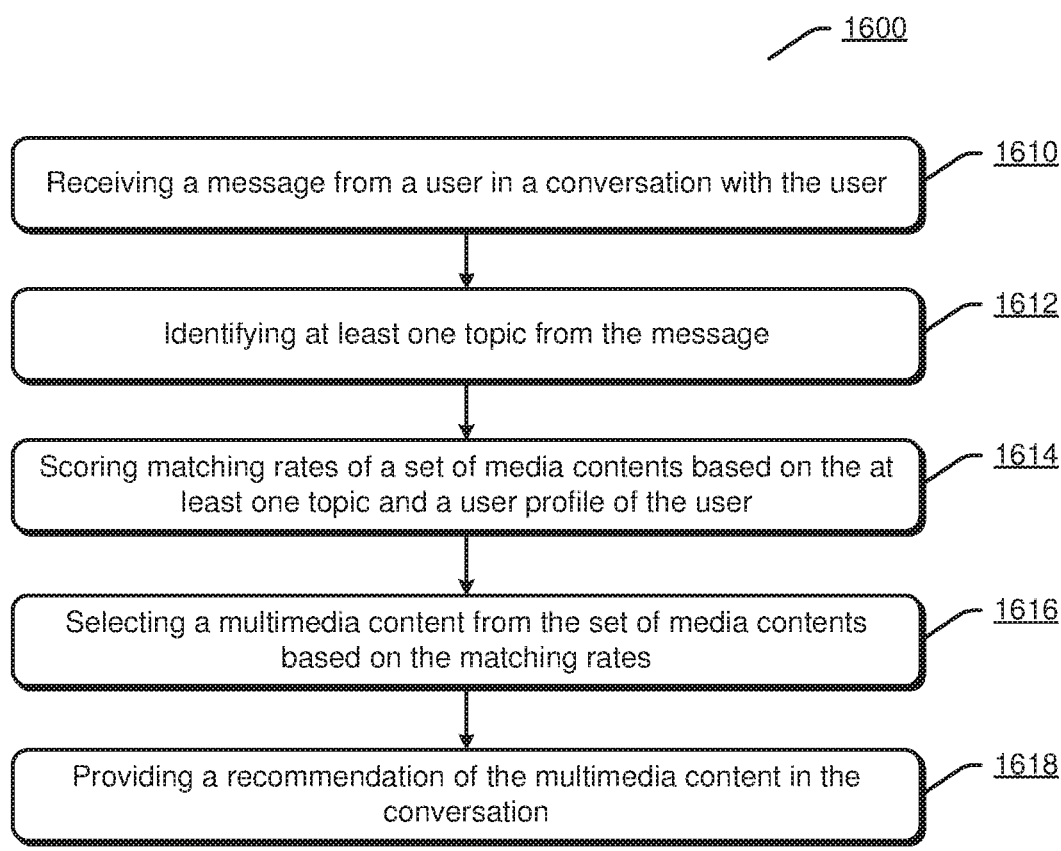
FIG. 16 illustrates an exemplary process for recommending media content through intelligent automated chatting according to an embodiment.

FIG. 16 illustrates an exemplary process 1600 for recommending media content through intelligent automated chatting.

At 1610, a message is received from a user in a conversation with the user. At 1612, at least one topic is identified from the message. At 1614, matching rates of a set of media contents are scored based on the at least one topic and a user profile of the user. At 1616, a media content is selecting from the set of media contents based on the matching rates. AT 1617, a recommendation of the media content is provided in the conversation.

Figure 17:
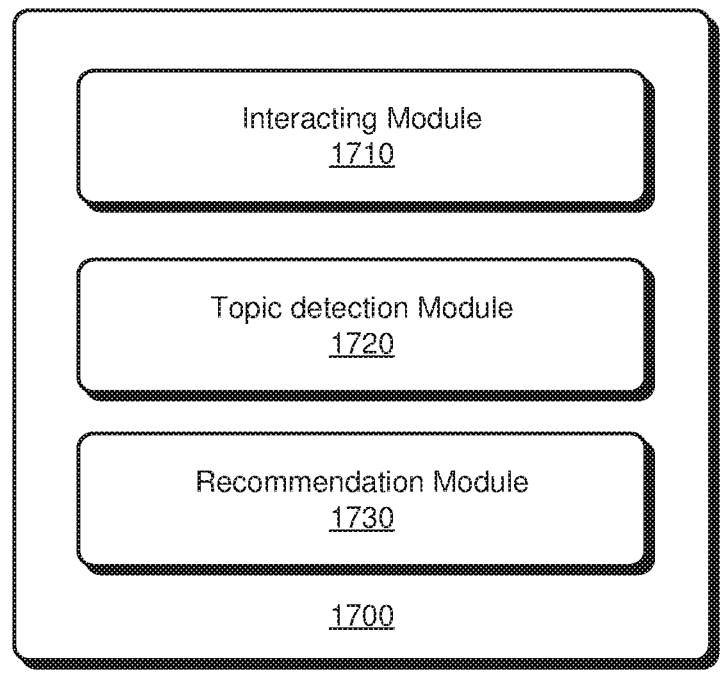
FIG. 17 illustrates an exemplary apparatus for automated intelligence chatting according to an embodiment.

FIG. 17 illustrates an exemplary apparatus 1700 for recommending media content through intelligent automated chatting.

The apparatus includes an interacting module 1710, a topic detection module 1720 and a recommendation module 1730. The interacting module 1710 receives a message in a conversation. The topic detection module 1720 identifies a new topic based on the message and context of the conversation. The recommendation module 1730 identifies a media content from a set of media contents based on the new topic. And the interacting module 1710 provides a recommendation of the media content in the conversation.

In an implementation, the topic detection module 1720 identifies the new topic based further on a knowledge graph related to the set of media contents. In an implementation, the knowledge graph comprises a first kind of data indicating attributes of the media contents and a second kind of data indicating similarity between media contents.

In an implementation, the recommendation module 1730 identifies the media content from the set of media contents by scoring matching rates of at least part of the set of media contents based on the new topic and a user profile of the user, and selecting the media content from the set of media contents based on the matching rates.

In an implementation, the recommendation module 1730 scores the matching rates based further on at least one of: a knowledge graph related to the set of media contents, the user's emotion in the context of the conversation, and bidding information of at least one of the set of media contents.

In an implementation, the media content comprises at east one of a television program and a video advertisement.

In an implementation, the apparatus comprises an operating module for performing at least one of the following in response to the user's feedback to the recommendation: playing the television program, booking the television program, and recording the television program.

In an implementation, the interaction module 1710 provides comments for an actor of the media content as the recommendation of the media content.

In an implementation, the interaction module 1710 provides comments for the media content as the recommendation of the media content.

In an implementation, the interaction module 1710 provides a representative image of the media content, or a short video clip of the media content, or the media content as the recommendation of the media content.

In an implementation, the interaction module 1710 provides broadcasting information related to the television program or purchasing information related to the video advertisement as the recommendation of the media content.

In an implementation, the apparatus comprises an actor comments generation module for generating the comments for the actor from a description text about the actor.

In an implementation, the apparatus comprises a media content comments generation module for generating the comments for the media content from a description text about the media content.

In an implementation, the apparatus comprises a short video clip generation module for generating the short video clip from the media content.

It should be appreciated that the apparatus 1700 may also comprise any other modules configured for performing any operations according to the various embodiments as mentioned above in connection with FIGS. 1-16.

Figure 18:
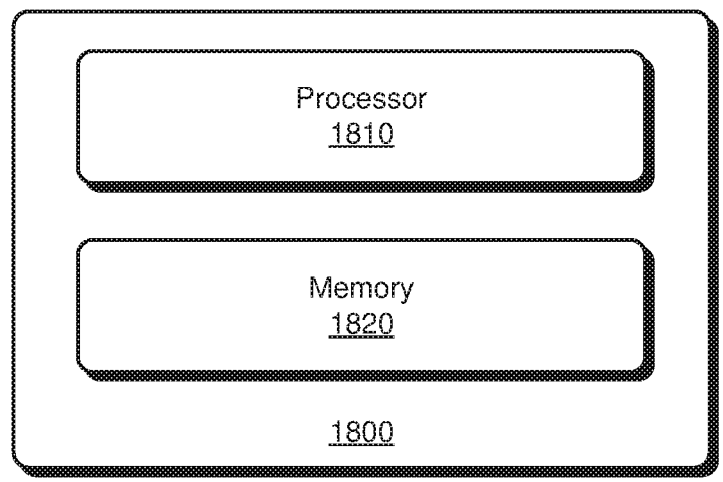
FIG. 18 illustrates an exemplary computing system according to an embodiment.

FIG. 18 illustrates an exemplary computing system 1800 according to an embodiment.

The system 1800 nay comprise one or more processors 1810. The system 1800 may further comprise a memory 1820 that is connected with the one or more processors 1810.

The memory 1820 may store computer-executable instructions that, when executed, cause the one or more processors 1810 to receive a message from a user in a conversation with the user; identify a new topic based on the message and context of the conversation; identify a media content from a set of media contents based on the new topic; and provide a recommendation of the media content in the conversation.

It should be appreciated that the computer-executable instructions, when executed, cause the one or more processors 1810 to perform any operations of the processes according to the embodiments as mentioned above in connection with FIGS. 1-17.

The embodiments of the present disclosure may be embodied in a non-transitory computer-readable medium. The non-transitory computer-readable medium may comprise instructions that, when executed, cause one or more processors to perform any operations of the processes according to the embodiments as mentioned above.

It should be appreciated that all the operations in the processes described above are merely exemplary, and the present disclosure is not limited to any operations in the processes or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for recommending media content through intelligent automated chatting, comprising:
    receiving a message in a conversation;
    identifying a new topic based on the message and context of the conversation;
    identifying a media content from a set of media contents based on the new topic;
    generating a short video clip for the media content using a neural network model including a convolution neural network (CNN) part and a recurrent neural network (RNN) part, and wherein the generating the short video clip further comprises:
dividing the media content into a plurality of clips;
mapping the plurality of clips into a plurality of vectors through the CNN part;
selecting a part of vectors representing clips that should be remained through the RNN part; and
generating the short video clip based on the part of vectors; and
providing a recommendation of the media content in the conversation.

2. The method of claim 1, wherein the identifying a new topic comprises:
identifying the new topic based further on a knowledge graph related to the set of media contents.

3. The method of claim 2, wherein the knowledge graph comprises a first kind of data indicating attributes of the media contents and a second kind of data indicating similarity between media contents.

4. The method of claim 1, wherein the identifying a media content from a set of media contents comprises:
scoring matching rates of at least part of the set of media contents based on the new topic and a user profile of the user; and
selecting the media content from the set of media contents based on the matching rates.

5. The method of claim 4, wherein the scoring matching rates comprises scoring the matching rates based further on at least one of:
a knowledge graph related to the set of media contents;
the user's emotion in the context of the conversation; and
bidding information of at least one of the set of media contents.

6. The method of claim 1, wherein the media content comprises at least one of a television program and a video advertisement.

7. The method of claim 6, further comprising performing at least one of the following in response to the user's feedback to the recommendation:
playing the television program;
booking the television program; and
recording the television program.

8. The method of claim 6, wherein the providing a recommendation of the media content comprises providing at least one of:
comments for an actor of the media content;
comments for the media content;
a representative image of the media content, or the short video clip of the media content, or the media content; and
broadcasting information related to the television program or purchasing information related to the video advertisement.

9. The method of claim 8, further comprising at least one of:
generating the comments for the actor from a description text about the actor by using a neural network model;
generating the comments for the media content from a description text about the media content by using a neural network model; and
generating the short video clip from the media content by using the neural network model.

10. An apparatus for recommending media content through intelligent automated chatting, comprising:

at least one processor; and
memory including instructions that, when executed by the at least one processor, cause the at least one processor to perform operations to:
receive a message in a conversation;
identify a new topic based on the message and context of the conversation;
identify a media content from a set of media contents based on the new topic;
generate a short video clip for the media content using a neural network model including a convolution neural network (CNN) part and a recurrent neural network (RNN) part, and wherein the generating the short video clip comprises:
divide the media content into a plurality of clips;
map the plurality of clips into a plurality of vectors through the CNN part;
select a part of vectors representing clips that should be remained through the RNN part; and
generate the short video clip based on the part of vectors; and
provide a recommendation of the media content in the conversation.

11. The apparatus of claim 10, wherein the new topic is identified based further on a knowledge graph related to the set of media contents.

12. The apparatus of claim 11, wherein the knowledge graph comprises a first kind of data indicating attributes of the media contents and a second kind of data indicating similarity between media contents.

13. The apparatus of claim 10, wherein the media content is identified from the set of media contents by:
scoring matching rates of at least part of the set of media contents based on the new topic and a user profile of the user; and
selecting the media content from the set of media contents based on the matching rates.

14. The apparatus of claim 13, wherein the matching rates are scored based further on at least one of:
a knowledge graph related to the set of media contents;
the user's emotion in the context of the conversation; and
bidding information of at least one of the set of media contents.

15. The apparatus of claim 10, wherein the media content comprises at least one of a television program and a video advertisement.

16. The apparatus of claim 15, further comprising performance of at least one of the following in response to the user's feedback to the recommendation:
playing the television program;
booking the television program; and
recording the television program.

17. The apparatus of claim 15, wherein the recommendation provides at least one of:
comments for an actor of the media content;
comments for the media content;
a representative image of the media content, or a short video clip of the media content, or the media content; and
broadcasting information related to the television program or purchasing information related to the video advertisement.

18. The apparatus of claim 17, further comprising at least one of:
comments for the actor generated from a description text about the actor;
the comments for the media content generated from a description text about the media content; and
the short video clip generated from the media content.

19. A computer system, comprising:

one or more processors; and a memory storing computer-executable instructions that, when executed, cause the one or more processors to:
- receive a message from a user in a conversation with the user;
- identify a new topic based on the message and context of the conversation;
- identify a media content from a set of media contents based on the new topic;
- generate a short video clip for the media content using a neural network model including a convolution neural network (CNN) part and a recurrent neural network (RNN) part, and wherein the generating the short video clip further comprises:
  - divide the media content into a plurality of clips;
  - map the plurality of clips into a plurality of vectors through the CNN part;
  - select a part of vectors representing clips that should be remained through the RNN part; and
- generate the short video clip based on the part of vectors; and
- provide a recommendation of the media content in the conversation.

\* \* \* \* \*